(12) United States Patent
Izumi

(10) Patent No.: US 11,235,419 B2
(45) Date of Patent: Feb. 1, 2022

(54) LASER MACHINING DEVICE FOR ADJUSTING FOCUS SHIFT BASED ON CONTAMINATION LEVEL OF OPTICAL SYSTEM DURING LASER MACHINING

(71) Applicant: FANUC CORPORATION, Yamanashi (JP)

(72) Inventor: Takashi Izumi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 271 days.

(21) Appl. No.: 16/130,486

(22) Filed: Sep. 13, 2018

(65) Prior Publication Data
US 2019/0076959 A1 Mar. 14, 2019

(30) Foreign Application Priority Data
Sep. 14, 2017 (JP) .............................. JP2017-177035

(51) Int. Cl.
*B23K 26/046* (2014.01)
*B23K 26/70* (2014.01)
*B23K 26/06* (2014.01)

(52) U.S. Cl.
CPC ........ *B23K 26/046* (2013.01); *B23K 26/0648* (2013.01); *B23K 26/705* (2015.10); *B23K 26/707* (2015.10)

(58) Field of Classification Search
CPC .. B23K 26/046; B23K 26/707; B23K 26/705; B23K 26/0648
USPC ............. 219/121.64, 121.75, 121.78, 121.83
See application file for complete search history.

(56) References Cited

U.S. PATENT DOCUMENTS

| 9,776,280 B2 | 10/2017 | Ogura et al. |
| 2016/0136756 A1* | 5/2016 | Ogura .................... B23K 26/21 219/121.62 |

FOREIGN PATENT DOCUMENTS

| CN | 105598580 A | 5/2016 |
| JP | 07214357 A | 8/1995 |
| JP | 11192573 A | 7/1999 |
| JP | 2002346783 A | 12/2002 |
| JP | 2006247681 A | 9/2006 |
| JP | 2014-117730 A | 6/2014 |
| JP | 2014117730 A * | 6/2014 |
| JP | 2015-199113 A | 11/2015 |
| JP | 2016097412 A | 5/2016 |

(Continued)

*Primary Examiner* — Thien S Tran
(74) *Attorney, Agent, or Firm* — RatnerPrestia

(57) ABSTRACT

A laser machining device includes a first focus movement amount calculation section configured to calculate a focus movement amount based on comparison of a first measurement value obtained by averaging a plurality of measurement values measured by a returning light measurement unit within a first period and a second measurement value obtained by averaging a plurality of measurement values measured by the returning light measurement unit within a second period that is temporally later than the first period; and a focus position correction section configured to correct a focus position during laser machining based on the focus movement amount, and the first period is a period shortly after initiation of laser emission when the external optical system is not warmed up or is a period after correcting the focus position, and the second period is a period after passage of a certain time duration when the external optical system is warmed up.

9 Claims, 19 Drawing Sheets

(56) References Cited

FOREIGN PATENT DOCUMENTS

JP 2017047456 A 3/2017

\* cited by examiner

FIG. 7

NORMAL TIME MACHINING CONDITIONS

| POWER | DUTY | FREQUENCY | SPEED | FOCUS POSITION | NOZZLE DIAMETER | GAS PRESSURE |
|---|---|---|---|---|---|---|
| 3000W | 80% | 5000Hz | 3000mm/min | 1mm | Φ1.5 | 1.2MPa |

POST-CORRECTION MACHINING CONDITION (1)

| POWER | DUTY | FREQUENCY | SPEED | FOCUS POSITION | NOZZLE DIAMETER | GAS PRESSURE |
|---|---|---|---|---|---|---|
| 3000W | 80% | 5000Hz | 3000mm/min | 0mm | Φ1.5 | 1.2MPa |

POST-CORRECTION MACHINING CONDITION (2)

| POWER | DUTY | FREQUENCY | SPEED | FOCUS POSITION | NOZZLE DIAMETER | GAS PRESSURE |
|---|---|---|---|---|---|---|
| 3500W | 80% | 5000Hz | 3000mm/min | 1mm | Φ1.5 | 1.2MPa |

POST-CORRECTION MACHINING CONDITION (3)

| POWER | DUTY | FREQUENCY | SPEED | FOCUS POSITION | NOZZLE DIAMETER | GAS PRESSURE |
|---|---|---|---|---|---|---|
| 3500W | 80% | 5000Hz | 3000mm/min | 0mm | Φ1.5 | 1.2MPa |

LASER MACHINING DEVICE FOR ADJUSTING FOCUS SHIFT BASED ON CONTAMINATION LEVEL OF OPTICAL SYSTEM DURING LASER MACHINING

CROSS-REFERENCE TO RELATED APPLICATIONS

This application is a new U.S. Patent Application that claims benefit of Japanese Patent Application No. 2017-177035, filed Sep. 14, 2017, the disclosure of this application is being incorporated herein by reference in its entirety for all purposes.

BACKGROUND OF THE INVENTION

1. Field of the Invention

The present invention relates to a laser machining device, and more particularly relates to a laser machining device that adjusts a focus shift based on a contamination level of an optical system during laser machining.

2. Description of the Related Art

Laser machining devices that perform laser machining of workpieces by irradiating the workpieces with laser light focus laser light on a predetermined focus position with a lens, and irradiate the workpieces with the focused laser light. In such a laser machining device, when the external optical system which guides the laser light from the laser oscillator and focuses it on the workpiece surface is contaminated and absorbs the laser light, the curvature changes and the focus position is moved due to what is known as the thermal lens effect. In addition, depending on how it was contaminated, the transmittance of the external optical system also varies. When a change in the focus position and a change in the transmittance occur, machining defects occur such that it is necessary to check whether the external optical system is contaminated. This is an obstacle to automatic operation.

In order to solve such problems, techniques for detecting contamination of external optical systems by attaching a temperature sensor or a scattered light sensor to the external optical systems are known. In addition, although not during laser machining, JP 2014-117730 A discloses a laser machining device configured to perform, before laser machining, predetermined machining a plurality of times at different focus positions as pre-machining, and setting, based on the relationship between the different focus positions (Fp) and the returning light occurrence period (T) corresponding to each different focus position, the focus position that gives the minimum value (Tm) of the returning light occurrence period as the focus position of the main machining. According to this laser machining device, it is described that setting of the focus position of laser light projected onto a workpiece can be performed stably with a high accuracy without using an independent large-scale device.

JP 2015-199113 A discloses a laser machining device for performing piercing machining, wherein the laser machining device is configured to control a beam diameter variable optical system such that the focusing diameter at the focus point of the laser beam is smaller along with the progression of the piercing machining. According to such a laser machining device, it is described that piercing machining conditions for optimum beam intensity during piercing machining can be selected with respect to the material properties and thickness to be machined.

SUMMARY OF THE INVENTION

The external optical system degrades with time. As a result, loss of laser power occurs at the focus point. As the focus position moves even with minor contamination, this leads to significant degradation in the quality of laser machining. In such cases, it is necessary to promptly replace or clean the optical components. However, when maintenance of optical components is performed after occurrence of machining defects, there is a problem that a large number of defective parts are produced during automatic operation. In contrast, in the method of attaching temperature sensors and scattered light sensors to the external optical system, there are problems in that, as additional equipment is necessary, the device is complicated and the external optical system is heavy, which affects the mechanical performance, and retrofitting cannot be performed. Further, since not all external optical systems are compatible with sensors that can detect contamination, there are times when contamination of the optical system is discovered after machining defects occur.

In addition, in the method of detecting returning light, there is a problem that the returning light cannot be stably detected depending on the type of laser machining actually performed, the material properties of the workpiece, and the surface condition of the workpiece. For example, in a system that performs laser welding, as the surface of a workpiece is melted at the time of welding (time of cleaning, marking) the surface state of the workpiece is not stabilized, and a large amount of noise is included in the returning light. In contrast, in systems that perform laser cutting, returning light can be detected at the time of hole formation machining, but at the time of cutting machining, returning light cannot be detected since the laser light penetrates the workpiece. In particular, in the fly cut used for laser cutting of thin plates, as the laser cutting is performed only by the ON/OFF of laser emission while moving the axis and there is no hole formation machining time when the axis is stopped, returning light cannot be stably detected.

Accordingly, there is demand for a technique for adjusting the focus shift in accordance with the contamination level of the external optical system while stably detecting the returning light during laser machining.

Aspects of the present disclosure provide a laser machining device configured to laser machine a workpiece while correcting a focus shift due to contamination of an optical system, the laser machining device including: a laser oscillator; an external optical system configured to guide laser light from the laser oscillator and focus the laser light on the surface of a workpiece; a returning light measurement unit configured to measure an energy amount of returning light reflected by the workpiece and returning to the laser machining device; a focus shift adjustment unit configured to adjust, based on the energy amount of the returning light during laser machining, a focus shift due to contamination of the external optical system, wherein the focus shift adjustment unit includes: a first focus movement amount calculation section configured to calculate a focus movement amount based on comparison of a first measurement value obtained by averaging a plurality of measurement values measured by the returning light measurement unit within a first period and a second measurement value obtained by averaging a plurality of measurement values measured by the returning light measurement unit within a second period that is temporally later than the first period; and a focus position correction section configured to correct a focus position during laser machining based on the calculated focus movement amount, and the first period is a period shortly after initiation of laser emission when the external optical system is not warmed up or is a period after correcting the focus position, and the second period is a period after passage of a certain time duration when the external optical system is warmed up.

Another aspect of the present disclosure provides a laser machining device configured to laser machine a workpiece while correcting a focus shift due to contamination of an optical system, the laser machining device including: a laser oscillator; an external optical system configured to guide laser light from the laser oscillator and focus the laser light on the surface of a workpiece; a returning light measurement unit configured to measure an energy amount of returning light reflected by the workpiece and returning to the laser machining device; a focus shift adjustment unit configured to adjust, based on the energy amount of the returning light during laser machining, a focus shift due to contamination of the external optical system, wherein the focus shift adjustment unit includes: a first focus movement amount calculation section configured to calculate a focus movement amount based on comparison of a first measurement value measured by the returning light measurement unit at a time of a first hole formation machining and a second measurement value measured by the returning light measurement unit at a time of a second hole formation machining that is temporally later than the time of the first hole formation machining; and a focus position correction section configured to correct a focus position during laser machining based on the calculated focus movement amount, and the time of the first hole formation machining is a point in time shortly after initiation of laser emission when the external optical system is not warmed up or is a point in time after correcting the focus position, and the time of the second hole formation machining is a point in time after passage of a certain time duration when the external optical system is warmed up.

Another aspect of the present disclosure provides a laser machining device configured to laser machine a workpiece while correcting a focus shift due to contamination of an optical system, the laser machining device including: a laser oscillator; an external optical system configured to guide laser light from the laser oscillator and focus the laser light on the surface of a workpiece; a returning light measurement unit configured to measure an energy amount of returning light reflected by the workpiece and returning to the laser machining device; a focus shift adjustment unit configured to adjust, based on the energy amount of the returning light during laser machining, a focus shift due to contamination of the external optical system, wherein the focus shift adjustment unit includes: an output command section configured to issue, with respect to the laser oscillator, a command to emit laser light at a predetermined output or a command to not emit laser light, a focus movement amount calculation section configured to calculate a focus movement amount based on comparison of a first measurement value obtained by averaging peak values measured by the returning light measurement unit when changing from the command not to emit laser light to the command to emit laser light within a first period and a second measurement value obtained by averaging peak values measured by the returning light measurement unit when changing from the command not to emit laser light to the command to emit laser light within a second period that is temporally later than the first period; and a focus position correction section configured to correct a focus position during laser machining based on the calculated focus movement amount, and the first period is a period shortly after initiation of laser emission when the external optical system is not warmed up or is a period after correcting the focus position, and the second period is a period after passage of a certain time duration when the external optical system is warmed up.

A further aspect of the present disclosure provides a laser machining device configured to laser machine a workpiece while correcting a focus shift due to contamination of an optical system, the laser machining device including: a laser oscillator; an external optical system configured to guide laser light from the laser oscillator and focus the laser light on the surface of a workpiece; a returning light measurement unit configured to measure an energy amount of returning light reflected by the workpiece and returning to the laser machining device; a focus shift adjustment unit configured to adjust, based on the energy amount of the returning light during laser machining, a focus shift due to contamination of the external optical system, wherein the focus shift adjustment unit includes: a change amount calculation section configured to calculate a change amount per unit time of the energy amount of the returning light measured by the returning light measurement unit, a focus movement amount calculation section configured to calculate a focus movement amount based on comparison of a first measurement value obtained by averaging peak values measured by the returning light measurement unit when the change amount per unit time calculated by the change amount calculation section within a first period is greater than or equal to a certain value and a second measurement value obtained by averaging peak values measured by the returning light measurement unit when the change amount per unit time calculated by the change amount calculation section within a second period that is temporally later than the first period is equal to or greater than a certain value; and a focus position correction section configured to correct a focus position during laser machining based on the calculated focus movement amount, and the first period is a period shortly after initiation of laser emission when the external optical system is not warmed up or is a period after correcting the focus position, and the second period is a period after passage of a certain time duration when the external optical system is warmed up.

BRIEF DESCRIPTION OF THE DRAWINGS

FIG. 7 is a diagram illustrating machining conditions at a normal time and machining conditions after correction.

DETAILED DESCRIPTION

Figure 1:
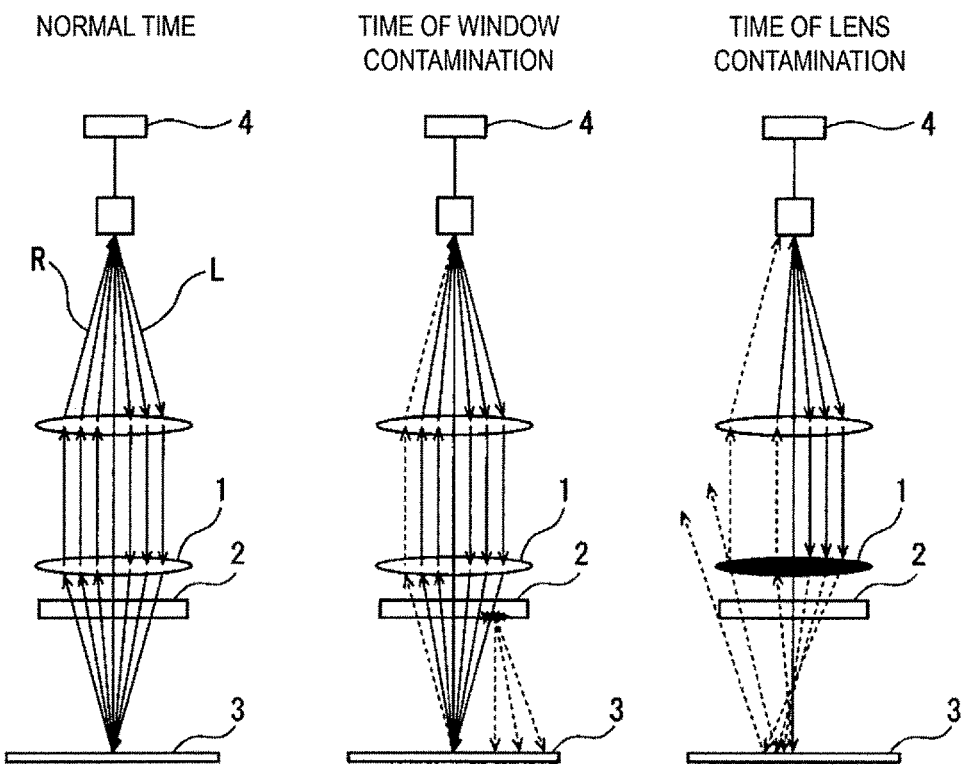
FIG. 1 is a schematic diagram for explaining types of contamination of an external optical system.

Hereinafter, embodiments of the present disclosure will be described in detail with reference to the accompanying drawings. In the drawings, the same or similar reference numerals are given to the same or similar constituent elements. In addition, the embodiments described below do not limit the technical scope of the invention or the meaning of the terms described in the claims.

Definitions of terms in the present specification will be explained. The term "lens" in the present specification refers to an optical component having a surface with curvature. Put differently, the lenses used in the present specification are optical components that have a large change in curvature as a result of what is known as the thermal lens effect when laser light is absorbed due to contamination. In addition, the term "window" in the present specification refers to an optical component including a substantially flat surface. Put differently, the windows used in the present specification are optical components with small changes in curvature even when laser light is absorbed due to contamination. Further, the term "contamination" in the present specification refers not only to a state in which dust has merely accumulated, but also includes states in which accumulated dust is sporadically burned with laser light, or states in which a thin film provided on a mirror or the like peels off and deteriorates.

FIG. 1 is a schematic diagram for explaining types of contamination of an external optical system. The external optical system includes, but is not limited to, a lens 1 for focusing laser light from a laser oscillator on the surface of a workpiece, and a window 2 disposed on the outermost side of the external optical system. In a case in which a focus position is set on the surface of a smooth reflection plate 3 made of copper having a constant reflectance (e.g., 98%) with respect to laser light and is arranged perpendicular to the optical axis of the laser light, and laser light L is emitted from an external optical system at an output (e.g., 10 W) which is low enough not to melt or deform the reflection plate 3, at normal time when the lens 1 and the window 2 are not contaminated, an energy amount of 98% (e.g., 9.8 W) is observed by a returning light measurement unit 4 which measures the energy amount of the returning light R which is reflected by the reflection plate 3 and returns to the inside of the laser machining device. It should be noted that, in FIG. 1, in order to facilitate understanding, the emitted laser light L is depicted on the right side of the optical axis of the laser light, and the returning light R reflected by the reflection plate 3 and returning is depicted on the left side of the optical axis. At a time of window contamination when only the window 2 is contaminated, as the window 2 absorbs or scatters the laser light L, the energy amount of the returning light measured by the returning light measurement unit 4 decreases. In addition, at a time of lens contamination when only the lens 1 is contaminated, as the focus position moves upward (or downward) due to the thermal lens effect of the lens 1, the energy amount of the returning light R measured by the returning light measurement unit 4 decreases. Further, although not illustrated in the drawings, in cases where both the lens 1 and the window 2 are contaminated, the energy amount of the returning light R measured by the returning light measurement unit 4 is minimized.

Figure 2:
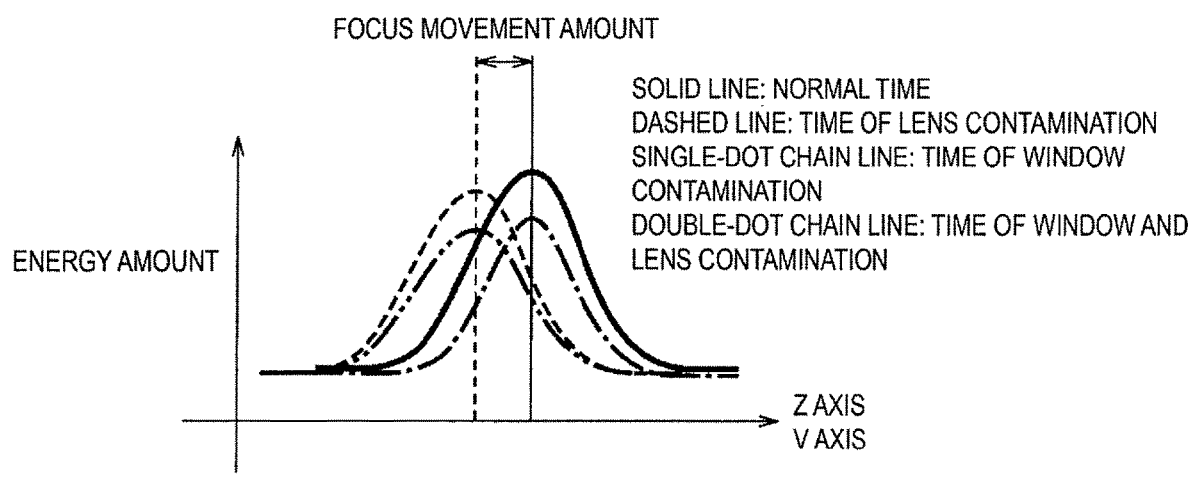
FIG. 2 is a graph illustrating the relationship between a focus movement amount and an energy amount of the returning light based on the type of contamination.

FIG. 2 is a graph illustrating the relationship between a focus movement amount and an energy amount of the returning light based on the type of contamination. As described above, at the time of lens contamination indicated by the dashed line, the focus position moves and the energy amount decreases in comparison with the normal time indicated by the solid line. In addition, at the time of window contamination indicated by the one-dot chain line, although the focus position does not move, the energy amount decreases. Further, at times of lens and window contamination as indicated by the two-dot chain line, the focus position moves and the energy amount is a minimum. However, in cases where laser light is emitted with the focus position aligned above or below the surface of the reflection plate 3, as the focus position may shift closer to the surface of the reflection plate 3, it should be noted that there are cases in which the energy amount of the returning light may rise. In addition, although the thermal lens effect occurs and the focus position moves in states in which the external optical system is warmed up by laser light having an output as high as that used for laser machining, in states where the external optical system is not warmed immediately after the start of laser machining, the thermal lens effect does not occur and the focus position does not move even in the case where the lens is contaminated. The laser machining device according to the present embodiment leverages this physical phenomenon to adjust the focus shift based on the contamination level of the external optical system during laser machining.

Figure 3:
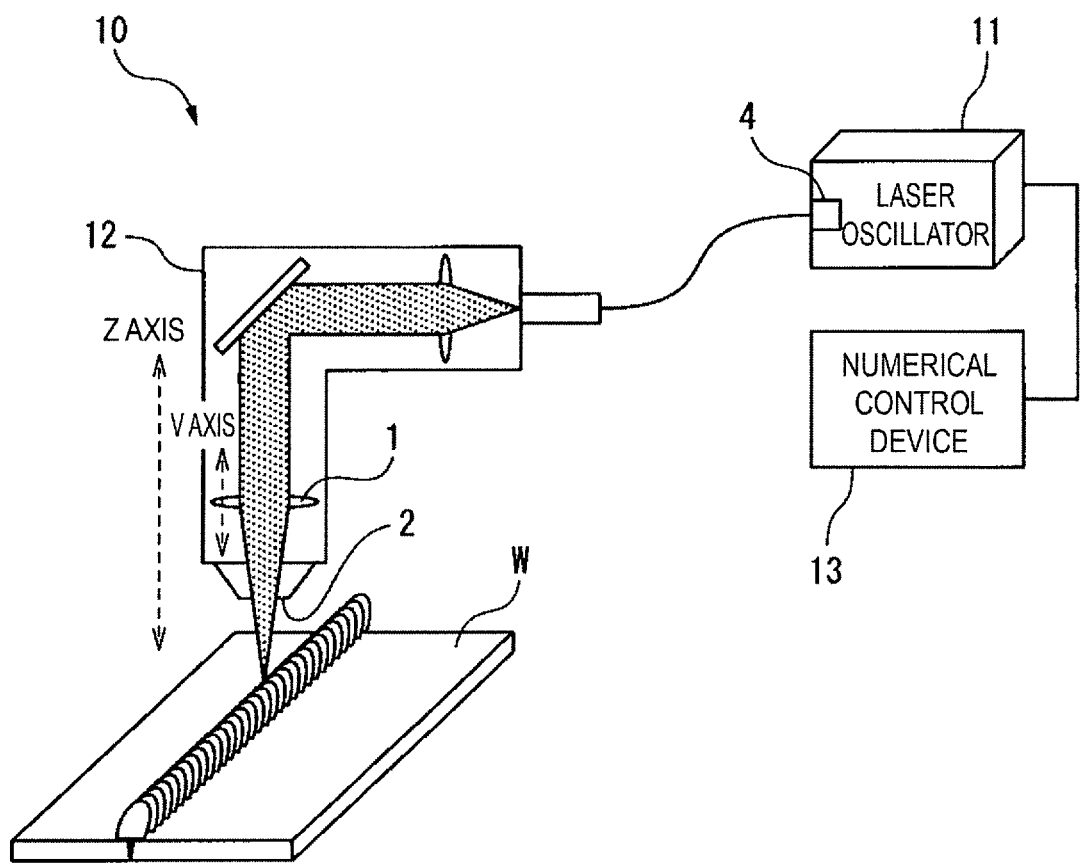
FIG. 3 is a schematic diagram illustrating a schematic configuration of a laser machining device according to an embodiment.

FIG. 3 is a schematic diagram illustrating a schematic configuration of a laser machining device 10 according to the present embodiment. The laser machining device 10 is directed to systems that perform laser machining capable of continuously detecting returning light, such as systems that perform laser welding, for example, and includes a laser oscillator 11, an external optical system 12 for guiding the laser light from the laser oscillator 11 to focus it on the surface of the workpiece, and a numerical controller 13 for controlling the entire laser machining device 10. The laser oscillator 11, is, for example, a fiber laser oscillator with a wavelength from 1060 to 1080 nm. The laser machining device 10 further includes a returning light measurement unit 4 configured to measure the energy amount of returning light reflected by a workpiece W and returned to the laser machining device 10. The returning light measurement unit 4 can use an existing power sensor disposed inside the laser oscillator 11. In this way, the laser machining device 10 does not require an additional sensor. Alternatively, the returning light measurement unit 4 may be a power sensor disposed inside the machining head.

Figure 4A:
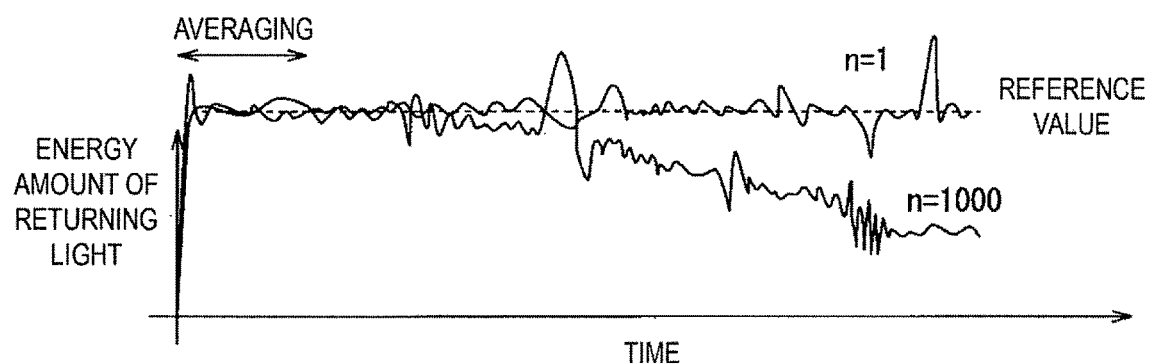
FIG. 4A is a graph relating to the energy amount and time of returning light when laser welding is performed n times (where n is an integer greater than or equal to 1).

FIG. 4A is a graph relating to the energy amount and time of returning light when laser welding is performed n times (where n is an integer greater than or equal to 1). As illustrated in FIG. 4A, in systems that perform laser welding, as the surface of the workpiece is melted at the time of welding (time of cleaning, marking) the surface state of the workpiece is not stabilized, and a large amount of noise is included in the returning light. In addition, in the first laser welding shortly after the initiation of laser emission, as the external optical system 12 is not warmed up, even in the case where the lens 1 is contaminated, focus shift due to the thermal lens effect does not occur, and there is no significant change in the energy amount of the returning light. In contrast, in the 1000th laser welding after a certain time has elapsed from the initiation of laser emission, as the external optical system 12 is warmed up, in cases where the lens 1 is contaminated, focus shift occurs due to the thermal lens effect, and the energy amount of the returning light decreases as time goes on. However, in cases where the laser light is emitted with the focus position aligned above or below the surface of the workpiece, as the focus position may shift closer to the surface of the workpiece, it should also be noted that the energy amount of the returning light may rise as time goes on.

Figure 4B:
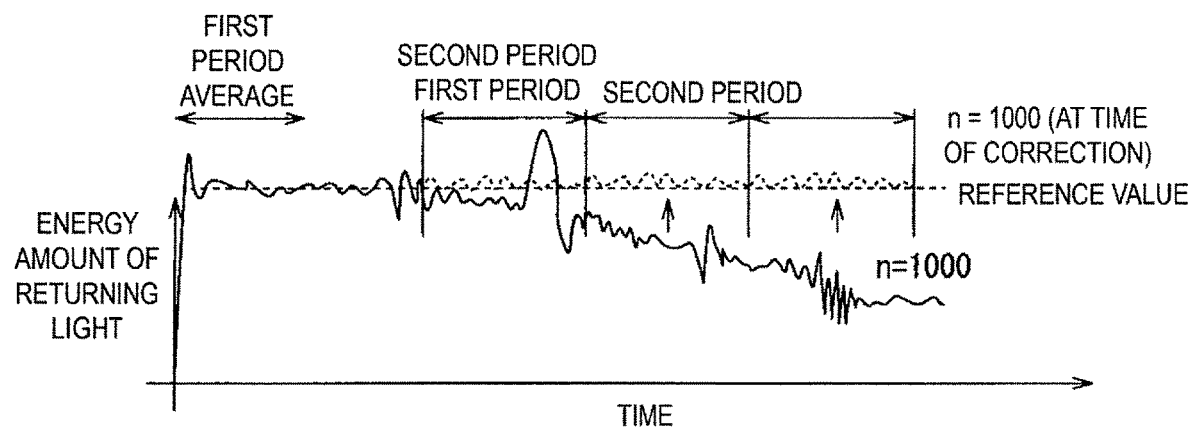
FIG. 4B is a graph relating to the energy amount and time of the returning light after adjustment of the focus shift in the 1000th laser welding.

FIG. 4B is a graph relating to the energy amount and time of the returning light after adjustment of the focus shift in the 1000th laser welding. In order to adjust the focus shift while taking the noise of the returning light into consideration, as illustrated in FIG. 4B, it is preferable to adjust the focus shift based on comparison of a first measurement value obtained by averaging a plurality of measurement values measured by the returning light measurement unit 4 within a first period and a second measurement value obtained by averaging a plurality of measurement values measured by the returning light measurement unit 4 within a second period that is temporally later than the first period. Further, it is preferable that this focus shift adjustment process be performed repeatedly, and as a first measurement value obtained by averaging a plurality of measurement values measured within the first period is used as a reference value, the first period needs to be a period shortly after initiation of laser emission (e.g., within 1 second) when the external optical system 12 is not warmed up, or alternatively, a period after the focus position has been corrected. In a case where the first period is a period after the focus position has been corrected, a first measurement value (reference value) can be obtained that is the same level as when the external optical system 12 is not warmed up. The second period is a period after passage of a certain time duration when the external optical system 12 has been warmed up. The first period and the second period may be intermittent, continuous, or overlapping.

Figure 5:
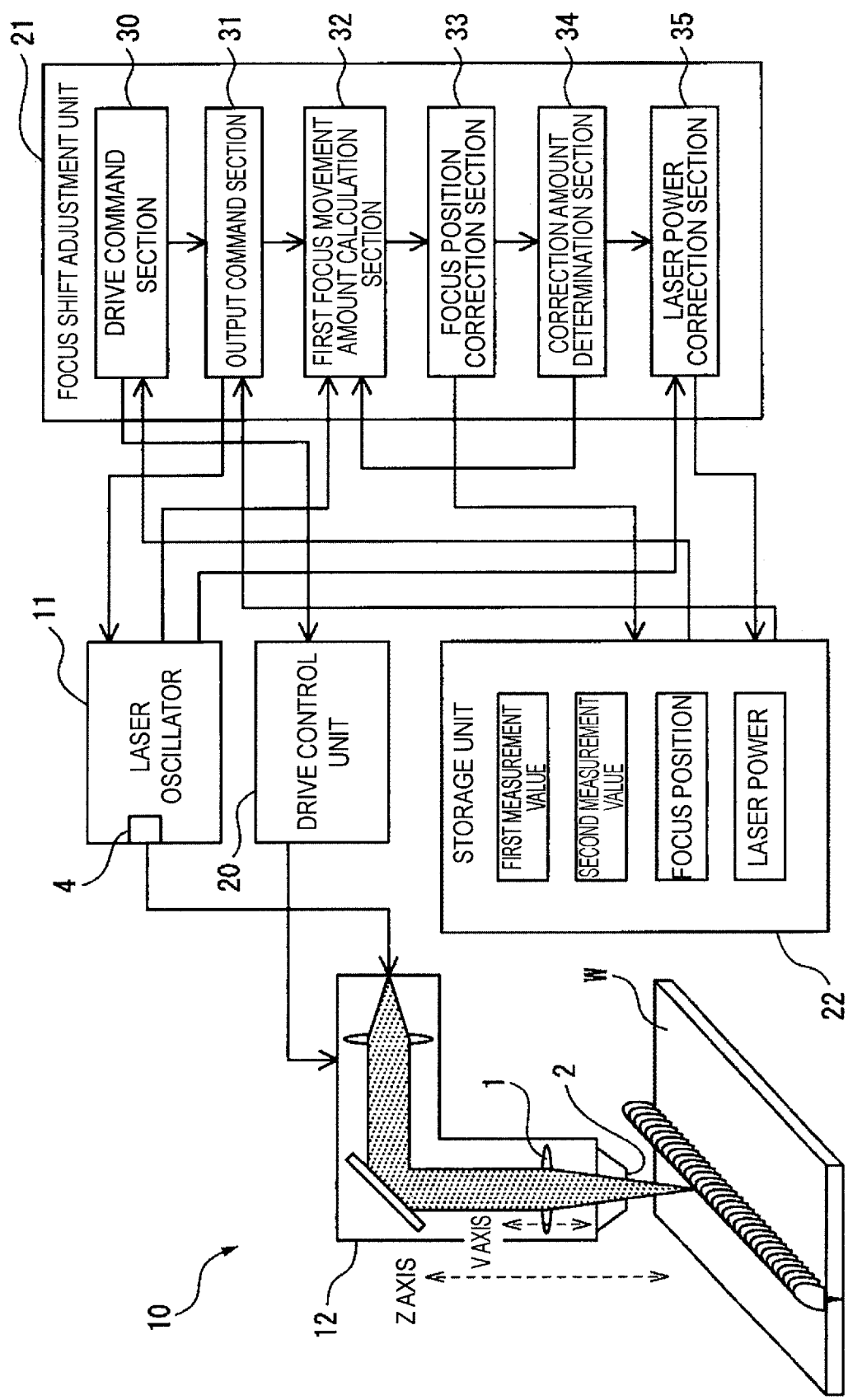
FIG. 5 is a block diagram illustrating a configuration of a laser machining device according to an embodiment.

FIG. 5 is a block diagram illustrating a configuration of the laser machining device 10 according to the present embodiment. The laser machining device 10 further includes a drive control unit 20 configured to move the focus position and the optical axis of the laser light emitted from the external optical system 12, a focus shift adjustment unit 21 constituted by a semiconductor integrated circuit such as an ASIC, an FPGA or the like, a processor, or a program that can be executed by a computer, and that is configured to adjust the focus shift due to contamination of the external optical system 12 based on the energy amount of the returning light during laser machining, and a storage unit 22 for storing various types of data. The focus shift adjustment unit 21 further includes a drive command section 30 configured to issue a command to the drive control unit 20 to set the focus position of the laser light on the workpiece W to a predetermined position, and an output command section 31 configured to issue a command to the laser oscillator 11 to emit laser light at a predetermined output (e.g., 3000 W). The focus shift adjustment unit 21 further includes a first focus movement amount calculation section 32 configured to calculate a focus movement amount based on comparison of a first measurement value obtained by averaging a plurality of measurement values measured by the returning light measurement unit 4 within a first period and a second measurement value obtained by averaging a plurality of measurement values measured by the returning light measurement unit 4 within a second period that is temporally later than the first period, and a focus position correction section 33 configured to correct the focus position during laser machining based on the calculated focus movement amount. The focus shift adjustment unit 21 further includes a correction amount determination section 34 configured to repeat correction of the focus position and determine whether the correction amount is correct, and a laser power correction section 35 configured to correct, in cases where the correction amount is incorrect, the laser power based on a comparison between the first measurement value and the second measurement value.

Figure 6:
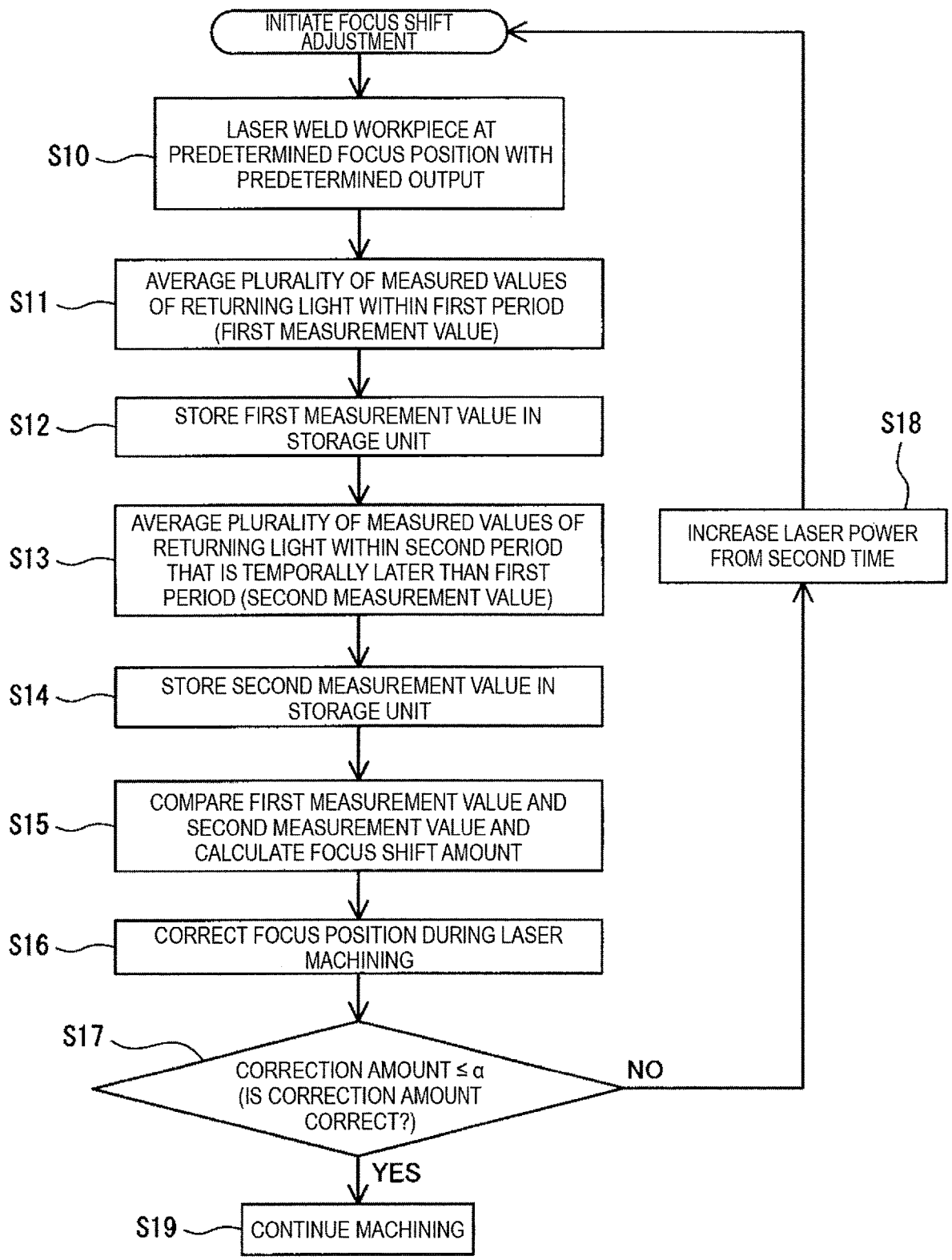
FIG. 6 is a flowchart illustrating the operation of the laser machining device according to an embodiment.

FIG. 6 is a flowchart illustrating the operation of the laser machining device 10 according to the present embodiment. Hereinafter, a process of adjusting the focus shift due to contamination of the external optical system based on the energy amount of the returning light during laser machining will be described with reference to FIG. 5 and FIG. 6. When the focus shift adjustment unit 21 initiates adjustment of the focus shift during laser machining, in Step S10, the drive command section 30 issues a command to the drive control unit 20 to adjust the focus position to a predetermined position, the output command section 31 issues a command to the laser oscillator 11 to emit a laser beam with a predetermined output, and the workpiece W is laser welded. In Step S11, the first focus movement amount calculation section 32 averages the plurality of measurement values measured by the returning light measurement unit 4 within the first period (first measurement value). In Step S12, the storage unit 22 stores the first measurement value. In Step S13, the first focus movement amount calculation section 32 averages the plurality of measurement values measured by the returning light measurement unit 4 within the second period that is temporally later than the first period (second measurement value). In Step S14, the storage unit 22 stores the second measurement value. In Step S15, the first focus movement amount calculation section 32 compares the first measurement value and the second measurement value, and calculates the focus movement amount (e.g., +1 mm). In Step S16, the focus position correction section 33 corrects the focus position during laser machining (e.g., corrects from 1 mm to 0 mm). In Step S17, the correction amount determination section 34 determines whether the correction amount is correct by comparing the correction amount with a margin α. In Step S17, in cases that the correction amount (e.g., −1 mm) exceeds the margin α (e.g., ±0.85), Step S10 is returned to, and the focus shift adjustment is repeated again. In Step S17, in cases that the correction amount (e.g., −0.9 mm) still exceeds the margin α (e.g., ±0.85), as there is a possibility that the energy amount of the returning light has been decreased not only from the focus shift due to contamination of the lens 1 but also due to contamination of the window 2, in Step S18, the laser power correction section 35 corrects the laser power based on a comparison of the first measurement value and the second measurement value (e.g., 3000 W is corrected to 3500 W). In Step S17, in cases that the correction amount (e.g., −0.3 mm) is less than or equal to the margin α (e.g., ±0.85), in Step S19, the laser machining device 10 continues laser machining based on the corrected focus position and the corrected laser power. As described above, it is preferable that the focus shift adjustment process be performed repeatedly. According to the laser machining device 10, it is possible to automatically adjust the focus shift according to the contamination level of the external optical system while stably detecting the returning light during the laser machining. As a result, as automatic operation can be continued without generating a large number of machining defects, the maintenance period of the external optical system can be prolonged.

FIG. 7 is a diagram illustrating machining conditions at a normal time and machining conditions (1) to (3) after correction. Though these machining conditions are not illustrated in the drawings, they are all stored in the storage unit 22 illustrated in FIG. 4. Machining condition (1) illustrates a case where the focus position at the time of laser machining is corrected from 1 mm to 0 mm. Machining condition (2) illustrates a case where the laser power is corrected from 3000 W to 3500 W. Machining condition (3) illustrates a case where the focus position and laser power are corrected to 0 mm and 3500 W, respectively.

Figure 8:
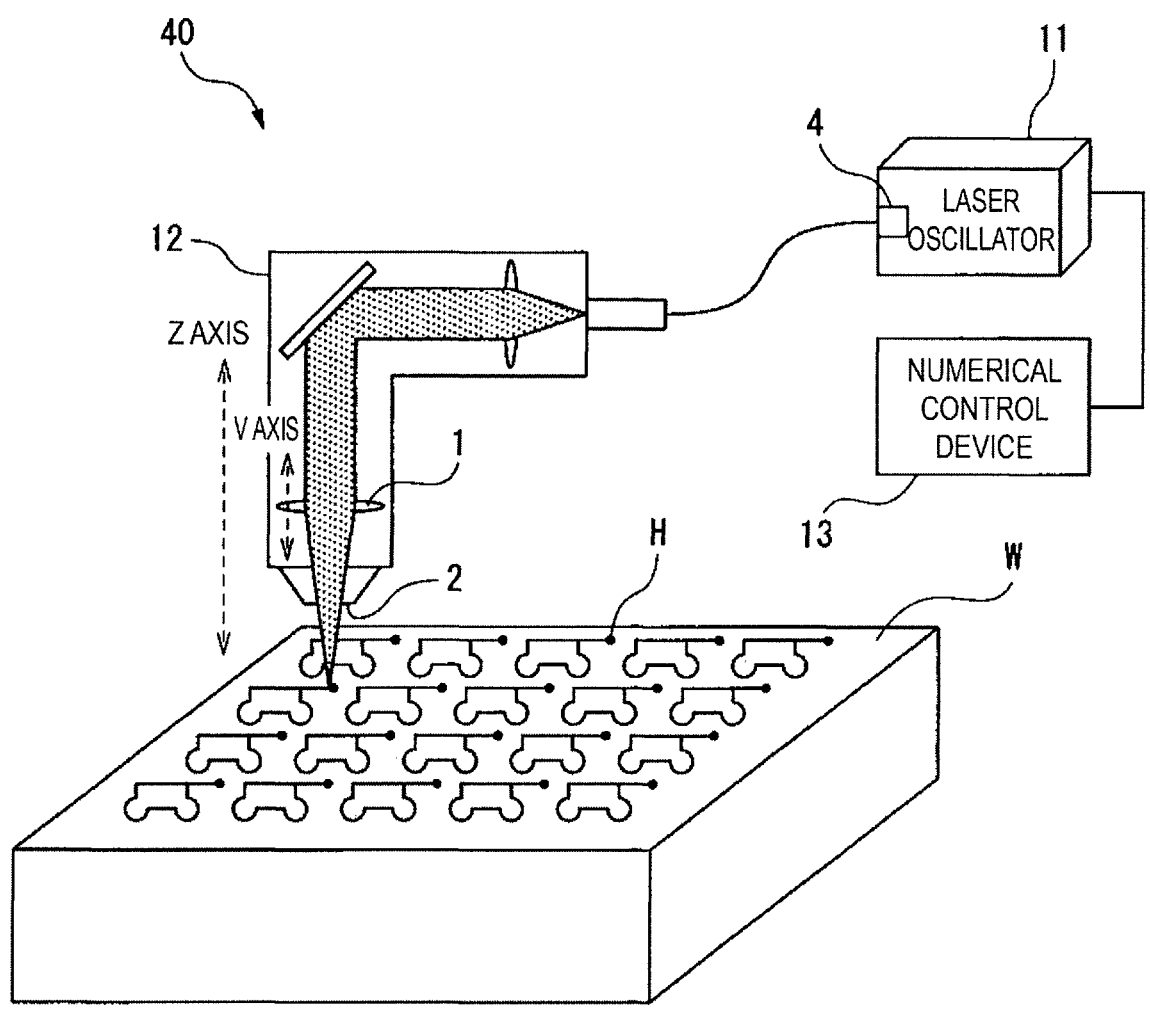
FIG. 8 is a schematic diagram illustrating a schematic configuration of a laser machining device according to another embodiment.

FIG. 8 is a schematic diagram illustrating a schematic configuration of a laser machining device 40 according to another embodiment. The laser machining device 40 differs from the laser machining device 10 illustrated in FIG. 5 in that it is directed to a system that performs the laser cutting accompanied by hole formation machining. For example, after performing hole formation with respect to a workpiece W to form a hole H, the laser machining device 40 repeats laser machining for cutting the workpiece W into a desired shape n times (where n is an integer greater than or equal to 1).

Figure 9:
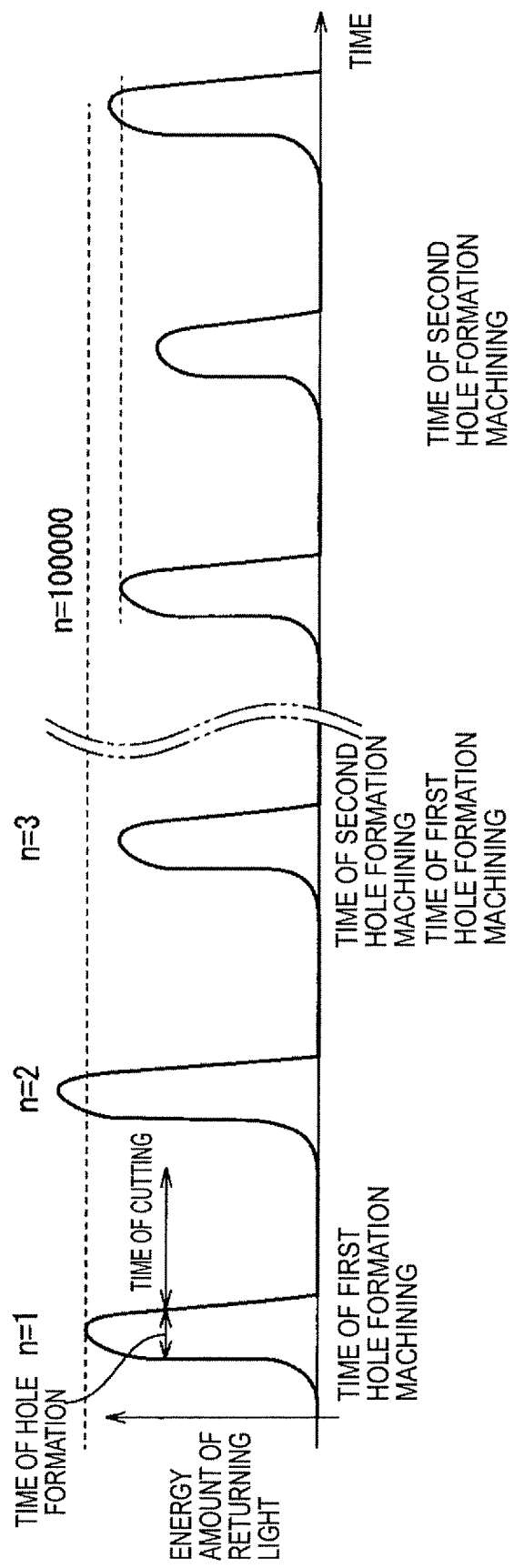
FIG. 9 is a graph relating to the energy amount and time of returning light when the laser cutting that accompanies hole formation machining is performed n times (where n is an integer greater than or equal to 1).

FIG. 9 is a graph relating to the energy amount and time of returning light when the laser cutting that accompanies hole formation machining is performed n times (where n is an integer greater than or equal to 1). As illustrated in FIG. 9, although returning light can be detected at the time of hole formation machining, at the time of cutting machining, returning light cannot be detected since the laser light penetrates the workpiece. In cases where the external optical system 12 illustrated in FIG. 8 is contaminated, focus shift from the thermal lens effect occurs due to repetition of laser cutting, and the energy amount of the returning light decreases as time goes on. However, in cases where laser light is emitted with the focus position aligned above or below the surface of the workpiece, as the focus position may shift closer to the surface of the workpiece, it should be noted that the energy amount of the returning light may rise as time goes on. In order to adjust the focus shift while taking into consideration the timing at which the returning light can be detected, it is preferable to adjust the focus shift based on comparison of a first measurement value measured by the returning light measurement unit 4 at the time of a first hole formation machining and a second measurement value measured by the returning light measurement unit 4 at the time of a second hole formation machining that is temporally later than the time of the first hole formation machining. Further, it is preferable that this focus shift adjustment process be performed repeatedly, and as a first measurement value measured at the time of the first hole formation machining is used as a reference value, the time of the first hole formuish machining needs to be a point in time shortly after initiation of laser emission (e.g., after 1 second) when the external optical system 12 is not warmed up, or alternatively, a point in time after the focus position has been corrected. In a case where the time of the first hole formation machining is a point in time after the focus position has been corrected, a first measurement value (reference value) can be obtained that is the same level as when the external optical system 12 is not warmed up. The time of the second hole formation machining is a point in time after a certain time duration when the external optical system 12 has been warmed up (e.g., n=100000).

Figure 10:
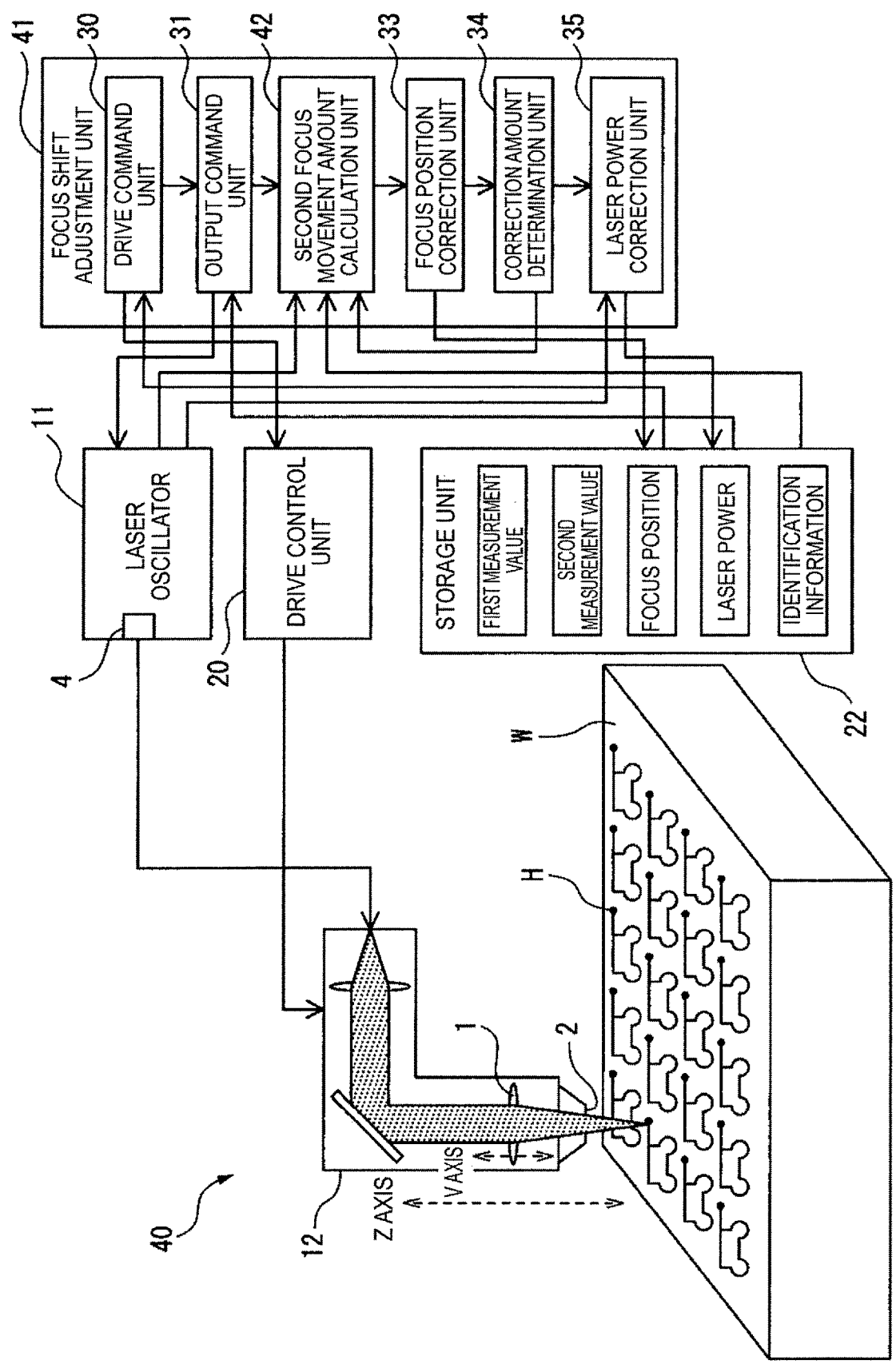
FIG. 10 is a block diagram illustrating a configuration of a laser machining device according to another embodiment.

FIG. 10 is a block diagram illustrating a configuration of the laser machining device 40. The laser machining device 40 includes a drive control unit 20 configured to move the focus position and the optical axis of the laser light emitted from the external optical system 12, a focus shift adjustment unit 41 constituted by a semiconductor integrated circuit such as an ASIC, an FPGA or the like, a processor, or a program that can be executed by a computer, and that is configured to adjust the focus shift due to contamination of the external optical system 12 based on the energy amount of the returning light during laser machining, and a storage unit 22 for storing various types of data. The focus shift adjustment unit 41 further includes a drive command section 30 configured to issue a command to the drive control unit 20 to set the focus position of the laser light on the workpiece W to a predetermined position, and an output command section 31 configured to issue a command to the laser oscillator 11 to emit laser light at a predetermined output (e.g., 3000 W). The focus shift adjustment unit 41 further includes a second focus movement amount calculation section 42 configured to calculate a focus movement amount based on comparison of a first measurement value measured by the returning light measurement unit 4 at the time of a first hole formation machining and a second measurement value measured by the returning light measurement unit 4 at the time of a second hole formation machining that is temporally later than the time of the first hole formation machining, and a focus position correction section 33 configured to correct the focus position during laser machining based on the calculated focus movement amount. The second focus movement amount calculation section 42 may distinguish between times of hole formation machining and times of machining other than hole formation machining (e.g., times of cutting) based on identification information for identifying the type of laser machining to be executed. The identification information is stored in the storage unit 22, and for example, a G code used by the numerical controller 13 can be used. In this way, it is possible to easily distinguish the peak value of the energy amount of the returning light at the time of hole formation machining. The focus shift adjustment unit 41 further includes a correction amount determination section 34 configured to repeat correction of the focus position and determine whether the correction amount is correct, and a laser power correction section 35 configured to correct, in cases where the correction amount is incorrect, the laser power based on a comparison between the first measurement value and the second measurement value.

Figure 11:
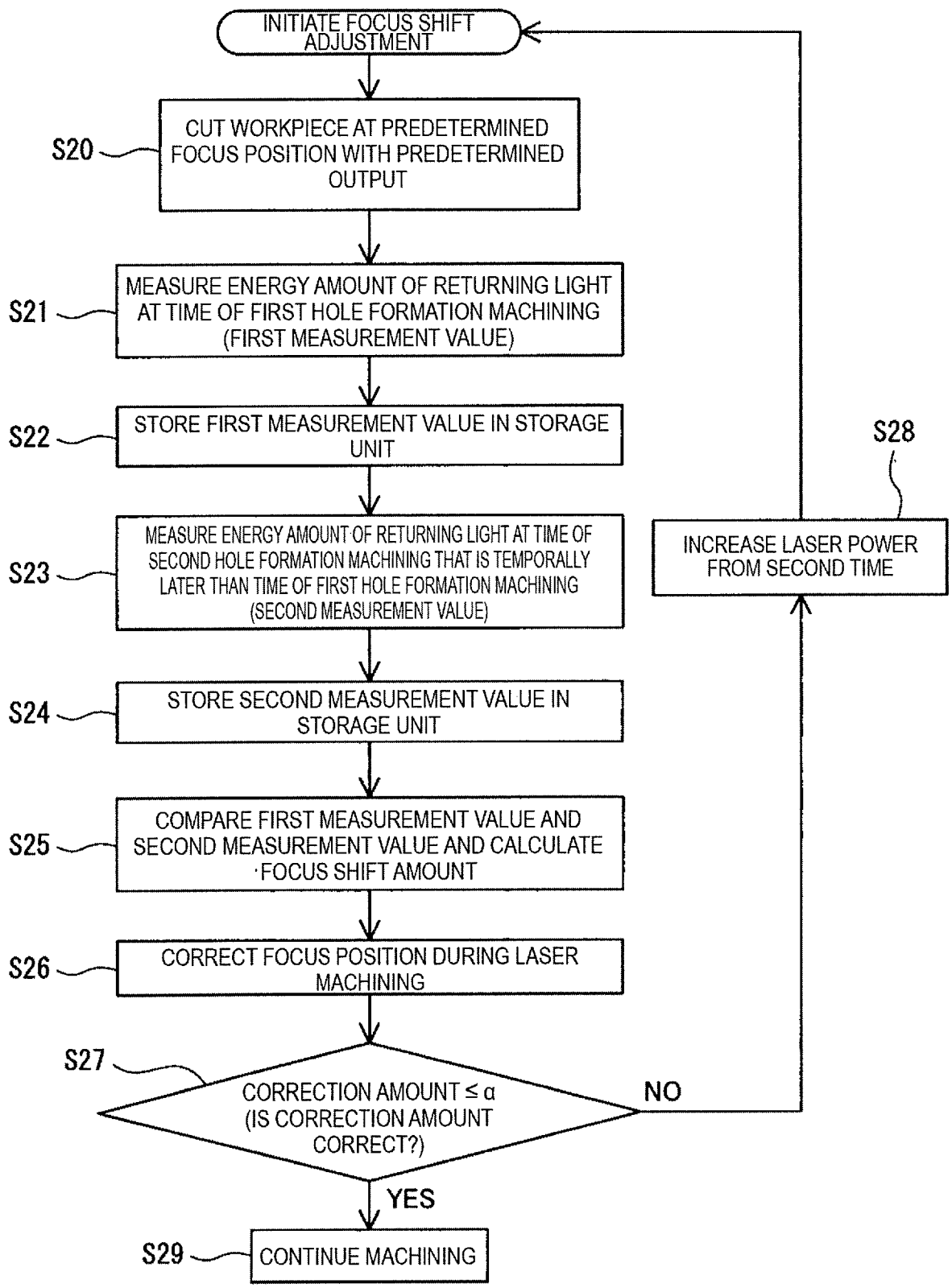
FIG. 11 is a flowchart illustrating the operation of the laser machining device according to another embodiment.

FIG. 11 is a flowchart illustrating the operation of the laser machining device 40. Hereinafter, a process of adjusting the focus shift due to contamination of the external optical system based on the energy amount of the returning light during laser machining will be described with reference to FIG. 10 and FIG. 11. When the focus shift adjustment unit 41 initiates adjustment of the focus shift during laser machining, in Step S20, the drive command section 30 issues a command to the drive control unit 20 to adjust the focus position to a predetermined position, the output command section 31 issues a command to the laser oscillator 11 to emit laser light with a predetermined output, and the workpiece W is laser cut. In Step S21, the second focus movement amount calculation section 42 obtains the first measurement value measured by the returning light measurement unit 4 during the first hole formation machining. In Step S22, the storage unit 22 stores the first measurement value. In Step S23, the second focus movement amount calculation section 42 obtains the second measurement value measured by the returning light measurement unit 4 at the time of the second hole formation machining that is temporally later than the time of the first hole formation machining. In Step S24, the storage unit 22 stores the second measurement value. In Step S25, the second focus movement amount calculation section 42 compares the first measurement value and the second measurement value, and calculates the focus movement amount (e.g., +1 mm). In Step S26, the focus position correction section 33 corrects the focus position during laser machining (e.g., corrects from 1 mm to 0 mm). In Step S27, the correction amount determination section 34 determines whether the correction amount is correct by comparing the correction amount with a margin α. In Step S27, in cases that the correction amount (e.g., −1 mm) exceeds the margin α (e.g., ±0.85), Step S20 is returned to, and the focus shift adjustment is repeated again. In Step S27, in cases that the correction amount (e.g., −0.9 mm) still exceeds the margin α (e.g., ±0.85), as there is a possibility that the energy amount of the returning light has been decreased not only due to the contamination of the lens 1 but also due to contamination of the window 2, in Step S28, the laser power correction section 35 corrects the laser power based on a comparison of the first measurement value and the second measurement value (e.g., 3000 W is corrected to 3500 W). In Step S27, in cases that the correction amount (e.g., −0.3 mm) is less than or equal to the margin α (e.g., ±0.85), in Step S29, the laser machining device 40 continues laser machining based on the corrected focus position and the corrected laser power. As described above, it is preferable that the focus shift adjustment process be performed repeatedly. According to the laser machining device 40, it is possible to automatically adjust the focus shift according to the contamination level of the external optical system while stably detecting the returning light during the laser machining. As a result, as automatic operation can be continued without generating a large number of machining defects, the maintenance period of the external optical system can be prolonged.

Figure 12:
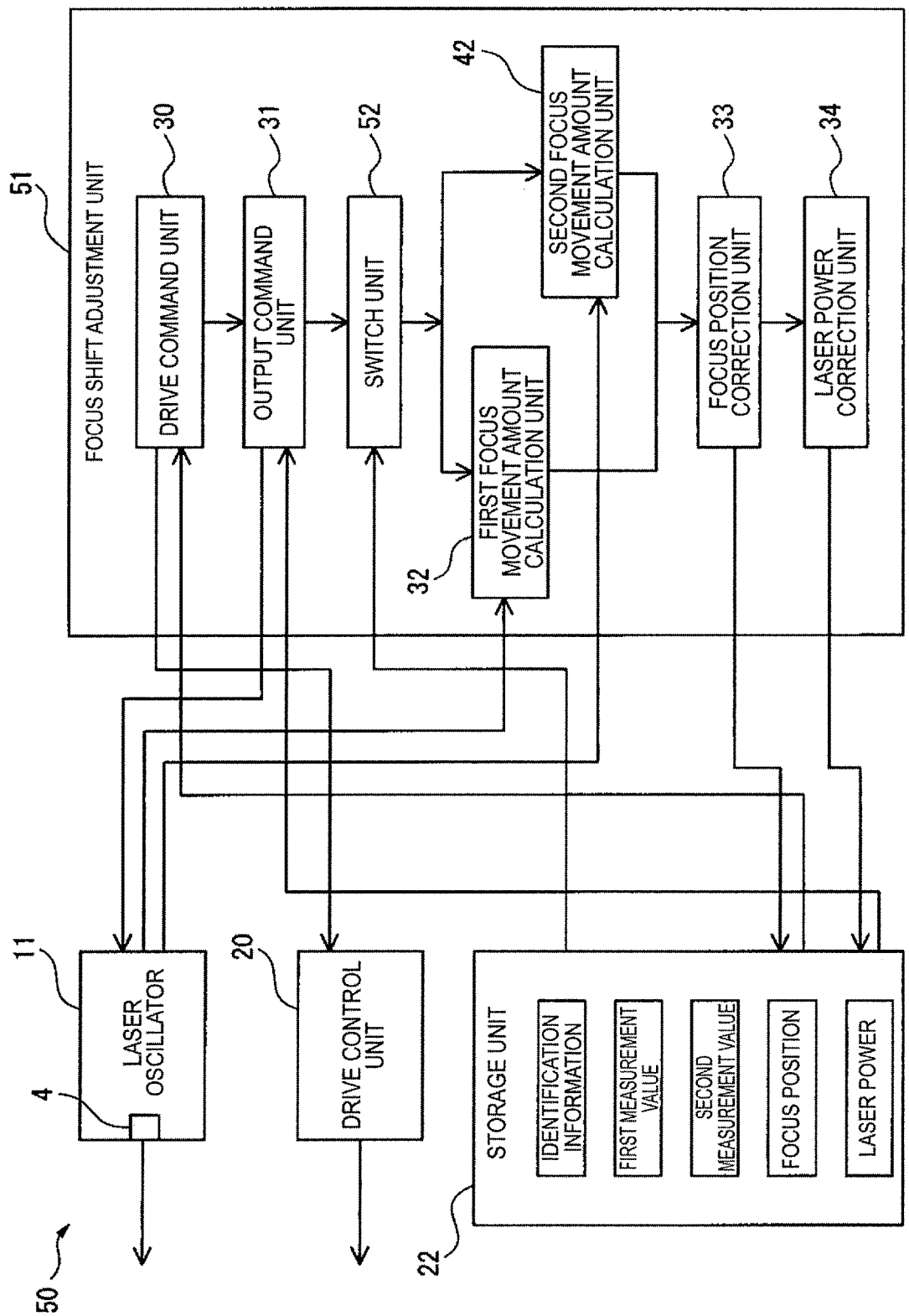
FIG. 12 is a block diagram illustrating a configuration of a laser machining device according to another embodiment.

FIG. 12 is a block diagram illustrating a configuration of a laser machining device 50 according to another embodiment. The focus shift adjustment unit 51 differs from the laser machining devices 10 and 40 described above in that it includes both the first focus movement amount calculation section 32 and the second focus movement amount calculation section 42, as well as a switching section 52 configured to switch between the first focus movement amount calculation section 32 and the second focus movement amount calculation section 42 based on identification information for identifying the type of laser machining to be executed. The identification information is stored in the storage unit 22, and for example, a G code used by the numerical controller 13 can be used. In this way, it is possible to distinguish between laser machining in which noise is included in returning light (e.g., laser welding) and laser machining capable of intermittently detecting returning light (e.g., laser cutting that accompanies hole formation machining). In cases that the identification information indicates laser machining in which noise is included in returning light, the switching section 52 switches to the first focus movement amount calculation section 32, and in cases where the identification information indicates laser machining capable of intermittently detecting returning light, the switching section 52 switches to the second focus movement amount calculation section 42. According to such a laser machining device 50, it is possible to automatically adjust the focus shift according to the contamination level of the external optical system while stably detecting the returning light during the laser machining, regardless of the type of laser machining. As a result, as automatic operation can be continued without generating a large number of machining defects, the maintenance period of the external optical system can be prolonged.

Figure 13:
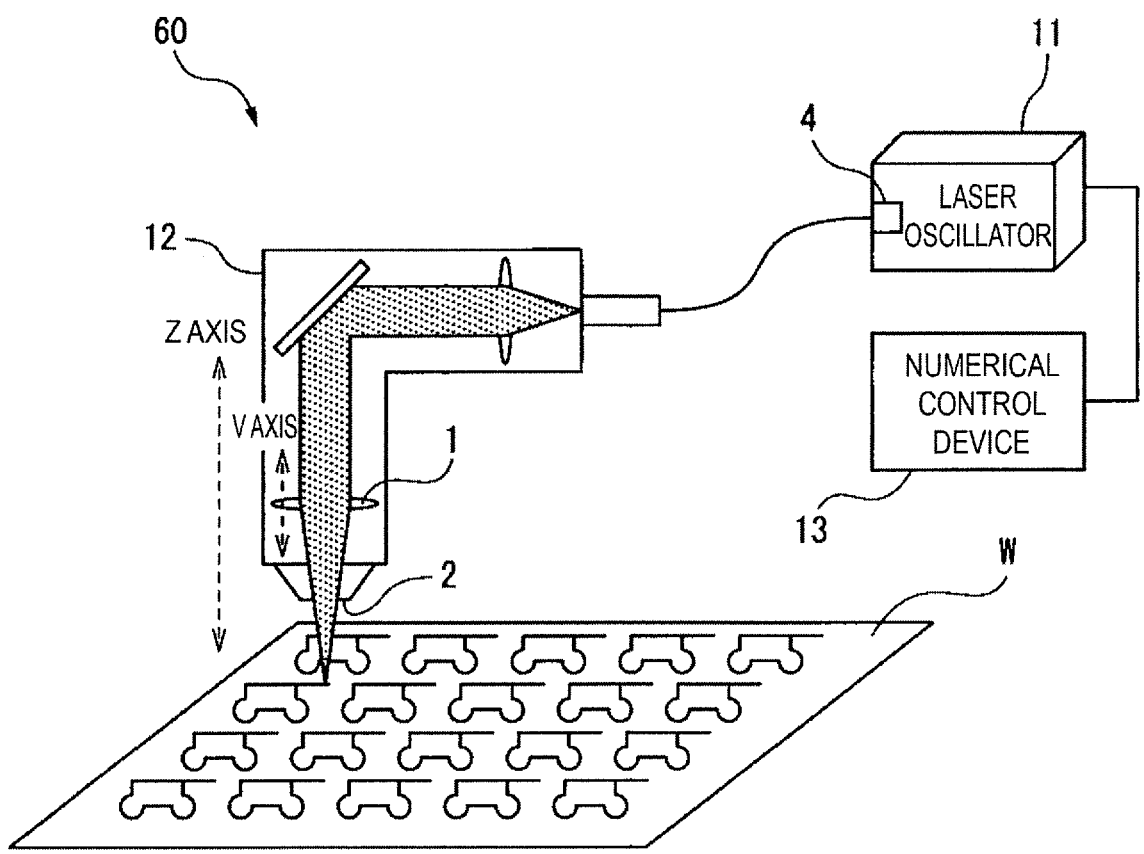
FIG. 13 is a schematic diagram illustrating a schematic configuration of a laser machining device according to yet another embodiment.

FIG. 13 is a schematic diagram illustrating a schematic configuration of a laser machining device 60 according to yet another embodiment. The laser machining device 60 differs from the laser machining device 40 of FIG. 8 in that it is directed to a system that performs laser cutting by fly cutting without hole formation machining. For example, the laser machining device 60 repeats laser machining for cutting the workpiece W into a desired shape n times while moving the axis with respect to the workpiece W (where n is an integer greater than or equal to 1).

Figure 14:
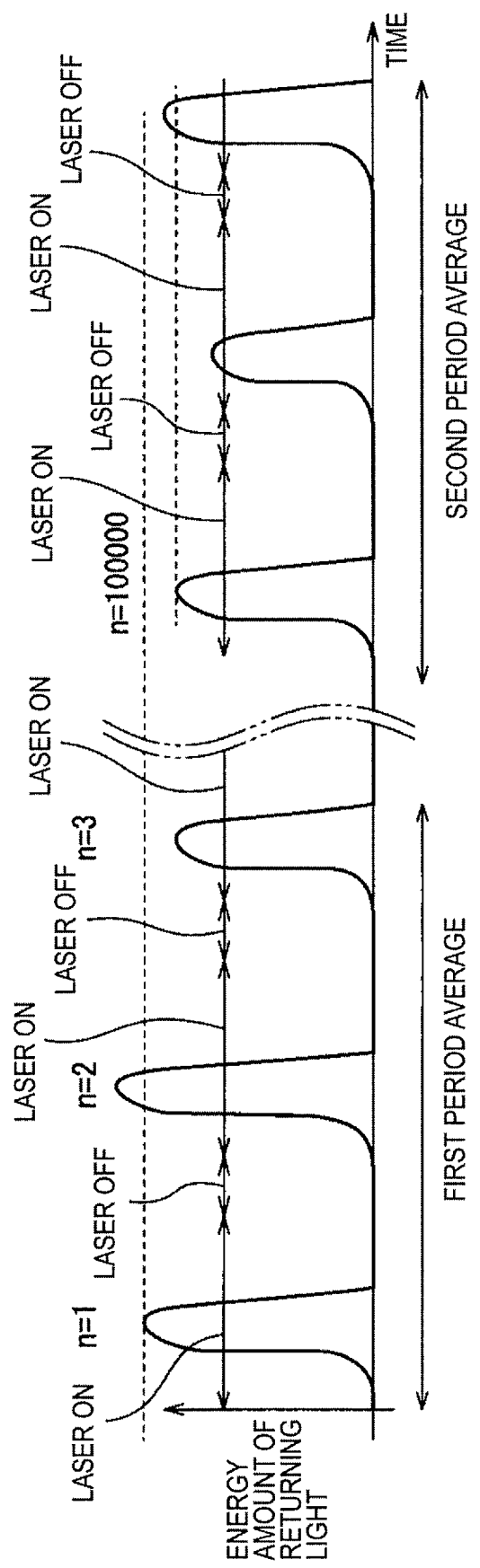
FIG. 14 is a graph relating to the energy amount and the time of returning light in a case where laser cutting in which a command to emit laser light and a command not to emit laser light are repeated is performed n times (where n is an integer greater than or equal to 1).

FIG. 14 is a graph relating to the energy amount and the time of returning light in a case where laser cutting in which a command to emit laser light (laser ON) and a command not to emit laser light (laser OFF) are repeated is performed n times (where n is an integer greater than or equal to 1). As illustrated in FIG. 14, although returning light can be detected when the laser is switched from laser OFF to laser ON, since the laser light penetrates the workpiece when a certain time (e.g., after approximately 2 milliseconds) has elapsed after switching to laser ON, returning light cannot be detected. In cases where the external optical system 12 illustrated in FIG. 13 is contaminated, focus shift from the thermal lens effect occurs due to repetition of laser cutting, and the energy amount of the returning light decreases as time goes on. However, in cases where the laser light is emitted with the focus position aligned above or below the surface of the workpiece, as the focus position may shift closer to the surface of the workpiece, it should also be noted that the energy amount of the returning light may rise as time goes on. In order to adjust the focus shift while taking into consideration the timing at which the returning light can be detected, it is preferable to adjust the focus shift based on comparison of a first measurement value obtained by averaging the peak values measured by the returning light measurement unit 4 when the laser is switched from laser OFF to laser ON within the first period and a second measurement value obtained by averaging the peak values measured by the returning light measurement unit 4 when the laser is switched from laser OFF to laser ON within the second period that is temporally later than the first period. Further, it is preferable that this focus shift adjustment process be performed repeatedly, and as the first measurement value obtained by averaging the peak values measured by the returning light measurement unit 4 when the laser is switched from laser OFF to laser ON within the first period is used as a reference value, the first period needs to be a period shortly after initiation of laser emission (e.g., within 1 second) when the external optical system 12 is not warmed up, or alternatively, a period after the focus position has been corrected. In a case where the first period is a period after the focus position has been corrected, a first measurement value (reference value) can be obtained that is the same level as when the external optical system 12 is not warmed up. The second period is a period after passage of a certain time duration (e.g., n=from 100000 to 100003) when the external optical system 12 has been warmed up.

Figure 15:
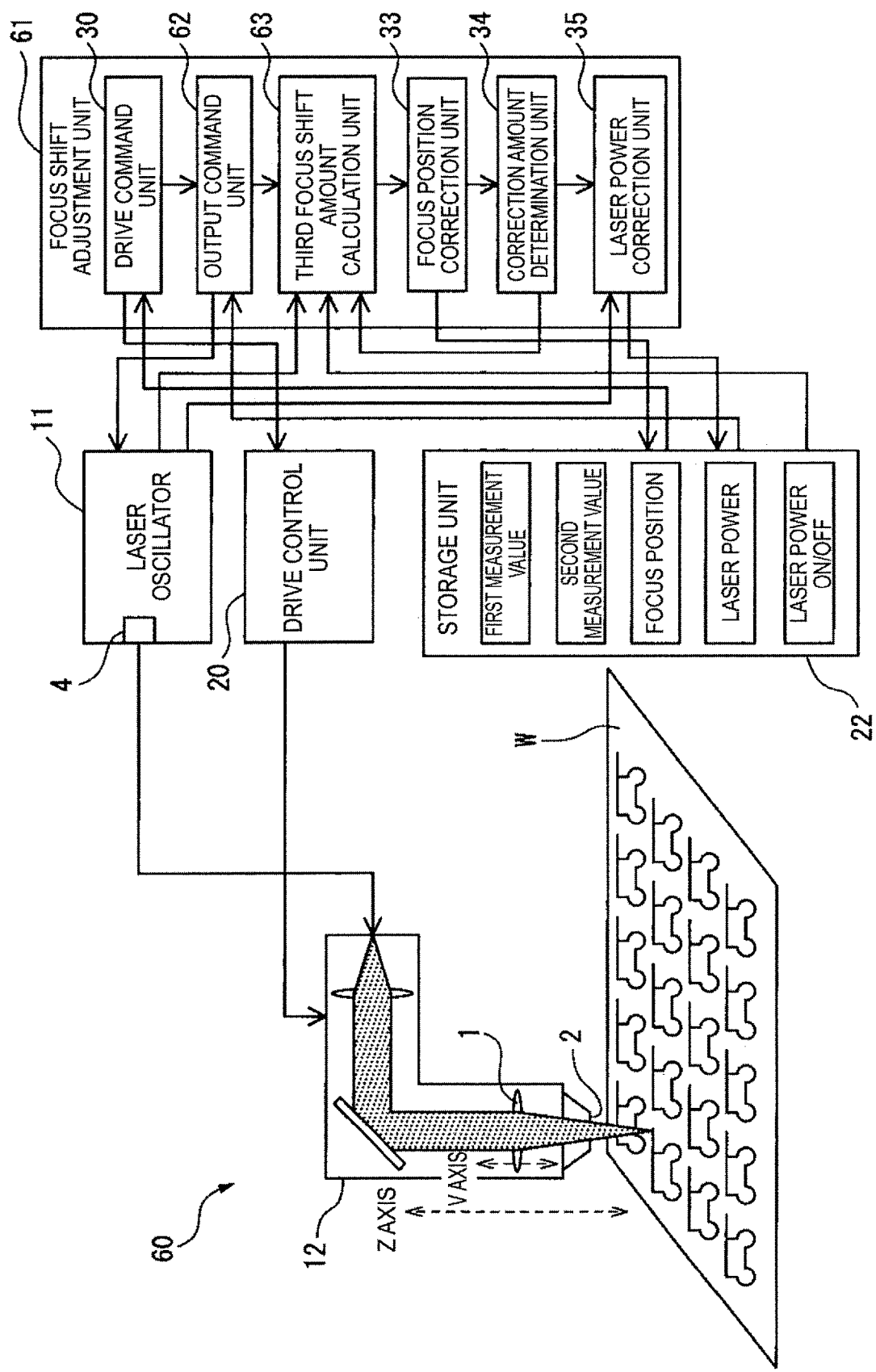
FIG. 15 is a block diagram illustrating a configuration of a laser machining device according to yet another embodiment.

FIG. 15 is a block diagram illustrating the configuration of a laser machining device 60. The laser machining device 60 includes a drive control unit 20 configured to move the focus position and the optical axis of the laser light emitted from the external optical system 12, a focus shift adjustment unit 61 constituted by a semiconductor integrated circuit such as an ASIC, an FPGA or the like, a processor, or a program that can be executed by a computer, and that is configured to adjust the focus shift due to contamination of the external optical system 12 based on the energy amount of the returning light during laser machining, and a storage unit 22 for storing various types of data. The focus shift adjustment unit 61 further includes a drive command section 30 configured to issue a command to the drive control unit 20 to move the focus position of the laser light on the workpiece W to a predetermined focus position, and an output command section 62 configured to issue a command (laser ON) to emit laser light at a predetermined output (e.g., 3000 W) or a command not to emit (laser OFF) to the laser oscillator 11. The focus shift adjustment unit 61 further includes a third focus movement amount calculation section 63 configured to calculate a focus movement amount based on comparison of a first measurement value obtained by averaging the peak values measured by the returning light measurement unit 4 when the laser is switched from laser OFF to laser ON within the first period and a second measurement value obtained by averaging the peak values measured by the returning light measurement unit 4 when the laser is switched from laser OFF to laser ON within the second period that is temporally later than the first period, and a focus position correction section 33 configured to correct the focus position during laser machining based on the calculated focus movement amount. That is, the third focus movement amount calculation section 63 determines the peak value of the energy amount of the returning light based on the laser ON and the laser OFF from the output command section 62. Information regarding the laser ON/OFF may be stored in the storage unit 22. In this way, it is possible to easily distinguish the peak value of the energy amount of the returning light. The focus shift adjustment unit 61 further includes a correction amount determination section 34 configured to repeat correction of the focus position and determine whether the correction amount is correct, and a laser power correction section 35 configured to correct, in cases where the correction amount is incorrect, the laser power based on a comparison between the first measurement value and the second measurement value.

Figure 16:
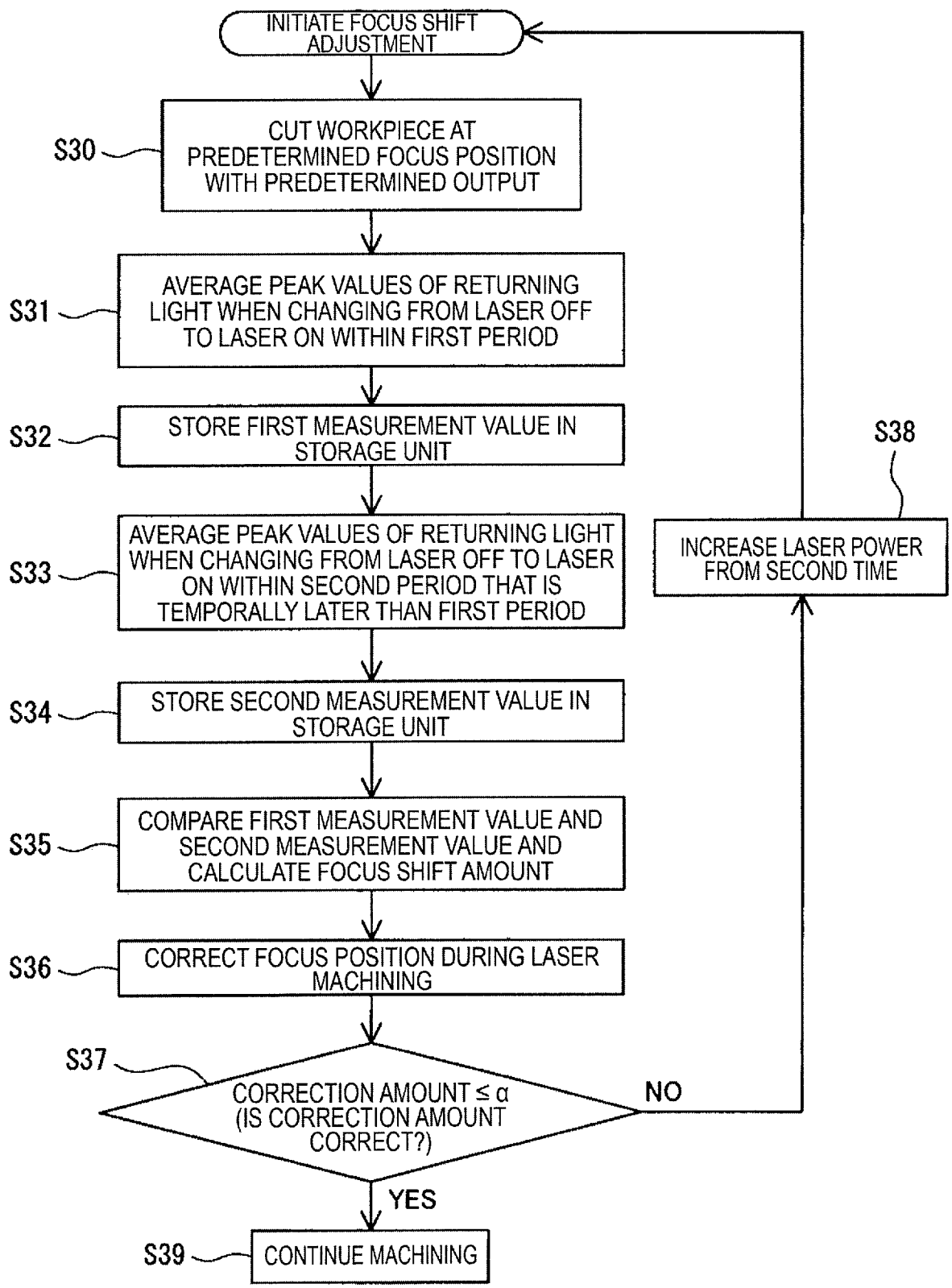
FIG. 16 is a flowchart illustrating the operation of a laser machining device according to yet another embodiment.

FIG. 16 is a flowchart illustrating the operation of the laser machining device 60. Hereinafter, a process of adjusting the focus shift due to contamination of the external optical system based on the energy amount of the returning light during laser machining will be described with reference to FIG. 15 and FIG. 16. When the focus shift adjustment unit 61 initiates adjustment of the focus shift during laser machining, in Step S30, the drive command section 30 issues a command to the drive control unit 20 to adjust the focus position to a predetermined position, the output command section 62 issues, to the laser oscillator 11, a command (laser ON) to emit laser light with a predetermined output or a command (laser OFF) not to emit laser light, and the workpiece W is laser cut. In Step S31, the third focus movement amount calculation section 63 acquires a first measurement value obtained by averaging the peak values measured by the returning light measurement unit 4 when the laser is switched from laser OFF to laser ON within the first period. In Step S32, the storage unit 22 stores the first measurement value. In Step S33, the third focus movement amount calculation section 63 acquires a second measurement value obtained by averaging the peak values measured by the returning light measurement unit 4 when the laser is switched from laser OFF to laser ON within the second period that is temporally later than the first period. In Step S34, the storage unit 22 stores the second measurement value. In Step S35, the third focus movement amount calculation section 63 compares the first measurement value and the second measurement value, and calculates the focus movement amount (e.g., +1 mm). In Step S35, the focus position correction section 33 corrects the focus position during laser machining (e.g., corrects from 1 mm to 0 mm). In Step S37, the correction amount determination section 34 determines whether the correction amount is correct by comparing the correction amount with a margin $\alpha$. In Step S37, in cases that the correction amount (e.g., −1 mm) exceeds the margin $\alpha$ (e.g., ±0.85), Step S30 is returned to, and the focus shift adjustment is repeated again. In Step S37, in cases that the correction amount (e.g., −0.9 mm) still exceeds the margin $\alpha$ (e.g., ±0.85), as there is a possibility that the energy amount of the returning light has been decreased not only due to contamination of the lens 1 but also due to contamination of the window 2, in Step S38, the laser power correction section 35 corrects the laser power based on a comparison of the first measurement value and the second measurement value (e.g., 3000 W is corrected to 3500 W). In Step S37, in cases that the correction amount (e.g., −0.3 mm) is less than or equal to the margin $\alpha$ (e.g., ±0.85), in Step S39, the laser machining device 60 continues laser machining based on the corrected focus position and the corrected laser power. As described above, it is preferable that the focus shift adjustment process be performed repeatedly. According to the laser machining device 60, it is possible to automatically adjust the focus shift according to the contamination level of the external optical system while stably detecting the returning light during the laser machining. As a result, as automatic operation can be continued without generating a large number of machining defects, the maintenance period of the external optical system can be prolonged.

Figure 17:
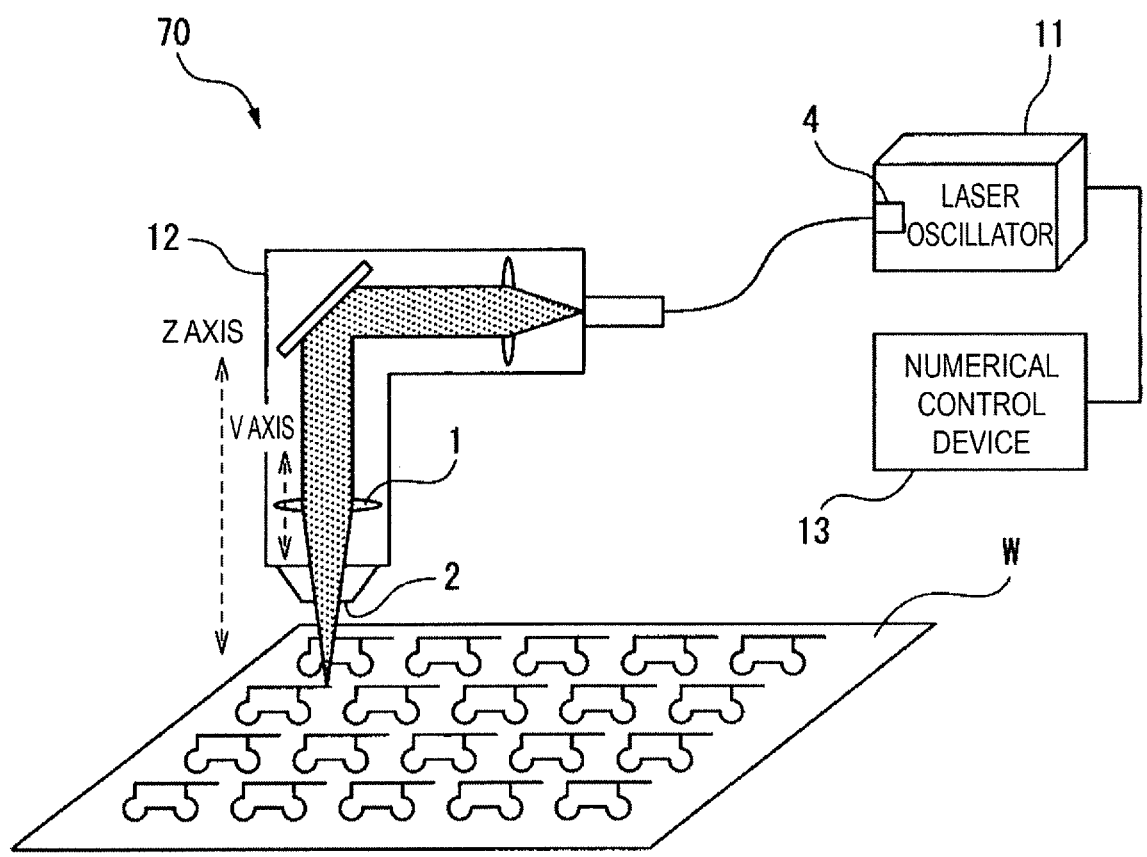
FIG. 17 is a schematic diagram illustrating a schematic configuration of a laser machining device according to yet another embodiment.

FIG. 17 is a schematic diagram illustrating a schematic configuration of a laser machining device 70 according to yet another embodiment. Similar to the laser machining device 60 of FIG. 13, the laser machining device 70 is directed to a system that performs laser cutting by fly cutting without hole formation machining. For example, the laser machining device 70 repeats laser machining for cutting the workpiece W into a desired shape n times while moving the axis with respect to the workpiece W (where n is an integer greater than or equal to 1).

Figure 18:
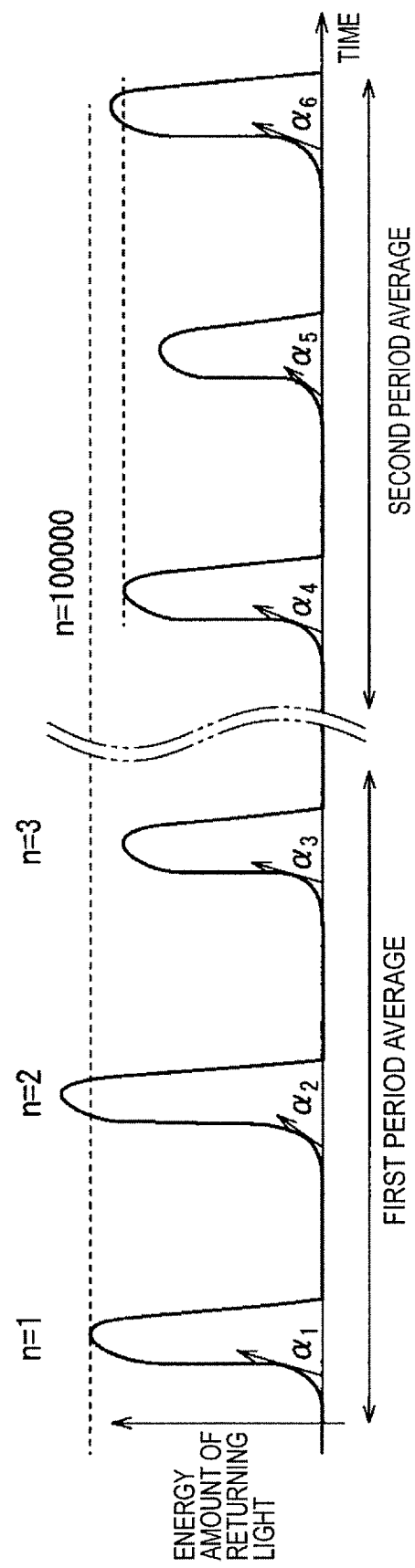
FIG. 18 is a graph relating to the energy amount and time of returning light when laser cutting is performed n times (where n is an integer greater than or equal to 1).

FIG. 18 is a graph relating to the energy amount and time of returning light when laser cutting is performed n times (where n is an integer greater than or equal to 1). As illustrated in FIG. 18, although the returning light can be detected when the change amount a per unit time (i.e., the slope of the graph) of the energy amount of the returning light is greater than or equal to a certain value (e.g., +1.73), the returning light cannot be detected when the change amount a per unit time (i.e., the slope of the graph) of the energy amount of the returning light is 0, as the laser light penetrates the workpiece. In cases where the external optical system 12 illustrated in FIG. 18 is contaminated, focus shift from the thermal lens effect occurs due to repetition of laser cutting, and the energy amount of the returning light decreases as time goes on. However, in cases where the laser light is emitted with the focus position aligned above or below the surface of the workpiece, as the focus position may shift closer to the surface of the workpiece, it should also be noted that the energy amount of the returning light may rise as time goes on. In order to adjust the focus shift while taking into consideration the timing at which the returning light can be detected, it is preferable to adjust the focus shift based on comparison of a first measurement value obtained by averaging peak values measured by the returning light measurement unit 4 when the change amount per unit time of the energy amount of the returning light is greater than or equal to a predetermined value within a first period and a second measurement value obtained by averaging peak values measured by the returning light measurement unit 4 when the change amount per unit time of the energy amount of the returning light is greater than or equal to a predetermined value within a second period that is temporally later than the first period. Further, it is preferable that this focus shift adjustment process be performed repeatedly, and as the first measurement value obtained by averaging peak values measured by the returning light measurement unit 4 when the change amount per unit time of the energy amount is greater than or equal to a predetermined value within the first period is used as a reference value, the first period needs to be a period shortly after initiation of laser emission (e.g., within 1 second) when the external optical system 12 is not warmed up, or alternatively, a period after the focus position has been corrected. In a case where the first period is a period after the focus position has been corrected, a first measurement value (reference value) can be obtained that is the same level as when the external optical system 12 is not warmed up. The second period is a period after passage of a certain time duration (e.g., n=from 100000 to 100003) when the external optical system 12 has been warmed up.

Figure 19:
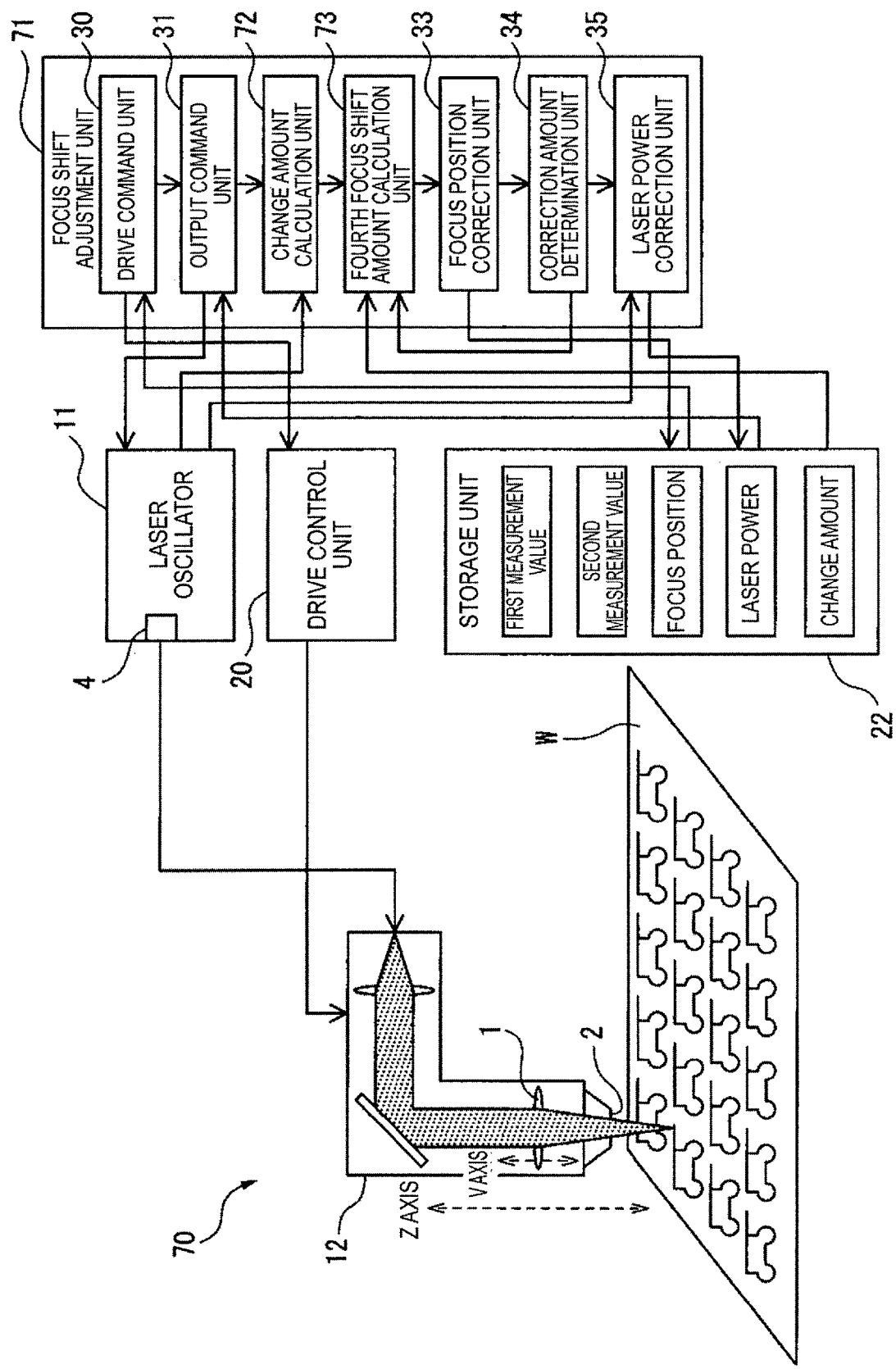
FIG. 19 is a block diagram illustrating a configuration of a laser machining device according to yet another embodiment.

FIG. 19 is a block diagram illustrating a configuration of the laser machining device 70. The laser machining device 70 includes a drive control unit 20 configured to move the focus position and the optical axis of the laser light emitted from the external optical system 12, a focus shift adjustment unit 71 constituted by a semiconductor integrated circuit such as an ASIC, an FPGA or the like, a processor, or a program that can be executed by a computer, and that is configured to adjust the focus shift due to contamination of the external optical system 12 based on the energy amount of the returning light during laser machining, and a storage unit 22 for storing various types of data. The focus shift adjustment unit 71 further includes a drive command section 30 configured to issue a command to the drive control unit 20 to move the focus position of the laser light on the workpiece W to a predetermined focus position, and an output command section 31 configured to issue a command to emit laser light at a predetermined output (e.g., 3000 W) to the laser oscillator 11. The focus shift adjustment unit 71 further includes a change amount calculation section 72 configured to calculate a change amount per unit time of the energy amount of the returning light measured by the returning light measurement unit 4, a fourth focus movement amount calculation section 73 configured to calculate a focus movement amount based on comparison of a first measurement value obtained by averaging peak values measured by the returning light measurement unit 4 when the change amount per unit time calculated by the change amount calculation section 72 within a first period is greater than or equal to a certain value and a second measurement value obtained by averaging peak values measured by the returning light measurement unit 4 when the change amount per unit time calculated by the change amount calculation section 72 within a second period that is temporally later than the first period is equal to or greater than a certain value, and a focus position correction section 33 configured to correct the focus position during laser machining based on the calculated focus movement amount. That is, the fourth focus movement amount calculation section 73 determines the peak value of the energy amount of the returning light based on the change amount per unit time from the change amount calculation section 72. Information regarding the change amount may be stored in the storage unit 22. In this way, it is possible to easily distinguish the peak value of the energy amount of the returning light. The focus shift adjustment unit 71 further includes a correction amount determination section 34 configured to repeat correction of the focus position and determine whether the correction amount is correct, and a laser power correction section 35 configured to correct, in cases where the correction amount is incorrect, the laser power based on a comparison between the first measurement value and the second measurement value.

Figure 20:
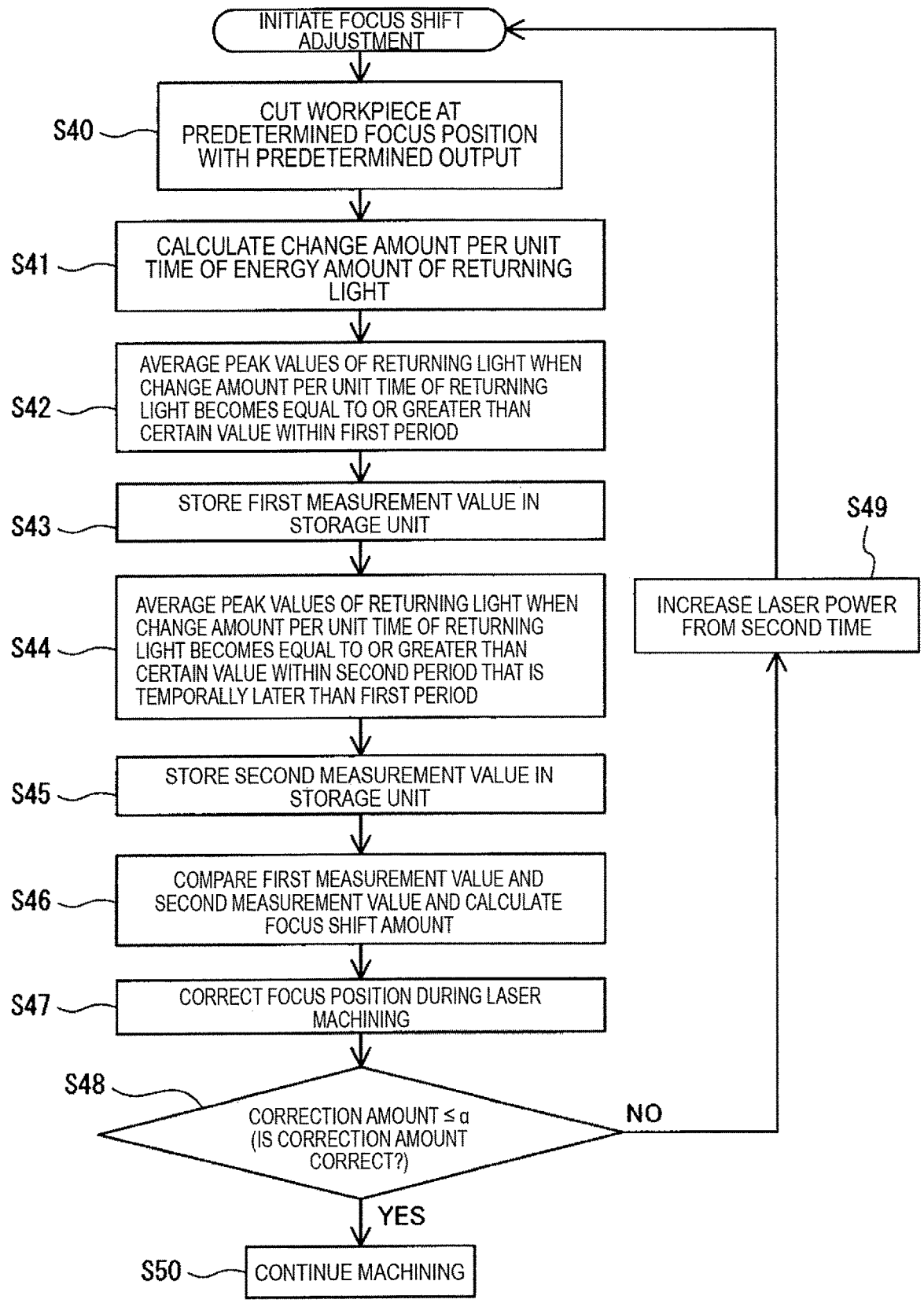
FIG. 20 is a flowchart illustrating the operation of a laser machining device according to yet another embodiment.

FIG. 20 is a flowchart illustrating the operation of the laser machining device 70. Hereinafter, a process of adjusting the focus shift due to contamination of the external optical system based on the energy amount of the returning light during laser machining will be described with reference to FIG. 19 and FIG. 20. When the focus shift adjustment unit 71 initiates adjustment of the focus shift during laser machining, in Step S40, the drive command section 30 issues a command to the drive control unit 20 to adjust the focus position to a predetermined position, the output command section 31 issues a command to the laser oscillator 11 to emit laser light with a predetermined output, and the workpiece W is laser cut. In Step S41, the change amount calculation section 72 calculates the change amount per unit time of the energy amount of the returning light. In Step S42, the fourth focus movement amount calculation section 73 acquires the first measurement value obtained by averaging peak values measured by the returning light measurement unit 4 when the change amount per unit time calculated by the change amount calculation section 72 within the first period is greater than or equal to a certain value. In Step S43, the storage unit 22 stores the first measurement value. In Step S44, the fourth focus movement amount calculation section 73 acquires the second measurement value obtained by averaging peak values measured by the returning light measurement unit 4 when the change amount per unit time calculated by the change amount calculation section 72 within the second period that is temporally later than the first period is equal to or greater than a certain value. In Step S45, the storage unit 22 stores the second measurement value. In Step S46, the fourth focus movement amount calculation section 73 compares the first measurement value and the second measurement value, and calculates the focus movement amount (e.g., +1 mm). In Step S47, the focus position correction section 33 corrects the focus position during laser machining (e.g., corrects from 1 mm to 0 mm). In Step S48, the correction amount determination section 34 determines whether the correction amount is correct by comparing the correction amount with a margin α. In Step S48, in cases that the correction amount (e.g., −1 mm) exceeds the margin α (e.g., ±0.85), Step S40 is returned to, and the focus shift adjustment is repeated again. In Step S48, in cases that the correction amount (e.g., −0.9 mm) still exceeds the margin α (e.g., ±0.85), as there is a possibility that the energy amount of the returning light has been decreased not only due to the contamination of the lens 1 but also due to contamination of the window 2, in Step S49, the laser power correction section 35 corrects the laser power based on a comparison of the first measurement value and the second measurement value (e.g., 3000 W is corrected to 3500 W). In Step S48, in cases that the correction amount (e.g., −0.3 mm) is less than or equal to the margin α (e.g., ±0.85), in Step S50, the laser machining device 70 continues laser machining based on the corrected focus position and the corrected laser power. As described above, it is preferable that the focus shift adjustment process be performed repeatedly. According to the laser machining device 70, it is possible to automatically adjust the focus shift according to the contamination level of the external optical system while stably detecting the returning light during the laser machining. As a result, as automatic operation can be continued without generating a large number of machining defects, the maintenance period of the external optical system can be prolonged.

The computer-executable program in the above-described embodiments can be provided by being recorded in a computer-readable non-transitory recording medium, a CD-ROM or the like. While various embodiments have been described in the present specification, it should be recognized that the present invention is not limited to the various embodiments described above, and various modifications can be made within the scope of the following claims.

The invention claimed is:

1. A laser machining device configured to laser machine a workpiece while correcting a focus shift due to contamination of an optical system, the laser machining device comprising:
   a laser oscillator;
   an external optical system being external to the laser oscillator and configured to guide laser light from the laser oscillator and focus the laser light on the surface of a workpiece;
   a returning light measurement unit that measures an energy amount of returning light reflected by the workpiece and returning to the laser machining device; and
   a focus shift adjustment unit that adjusts, based on the energy amount of the returning light of the laser light having an output as high as that used for laser machining during laser machining, a focus shift due to contamination of the external optical system,
   wherein
   the focus shift adjustment unit:
      calculates a first focus movement amount based on comparison of a first measurement value obtained by averaging a plurality of measurement values measured by the returning light measurement unit within a first period and a second measurement value obtained by averaging a plurality of measurement values measured by the returning light measurement unit within a second period that is temporally later than the first period; and
      corrects a focus position during laser machining based on the calculated first focus movement amount, and
   the first period is a period shortly after initiation of laser emission when the external optical system is not warmed up or is a period after correcting the focus position, and the second period is a period after passage of a certain time duration when the external optical system is warmed up.

2. The laser machining device of claim 1, wherein:
   a time of hole formation machining and a time of machining other than the hole formation machining is distinguished based on identification information for identifying a type of laser machining to be executed.

3. A laser machining device configured to laser machine a workpiece while correcting a focus shift due to contamination of an optical system, the laser machining device comprising:
   a laser oscillator;
   an external optical system being external to the laser oscillator and configured to guide laser light from the laser oscillator and focus the laser light on the surface of a workpiece;
   a returning light measurement unit that measures an energy amount of returning light reflected by the workpiece and returning to the laser machining device; and
   a focus shift adjustment unit that adjusts, based on the energy amount of the returning light of the laser light having an output as high as that used for laser cutting during laser cutting, a focus shift due to contamination of the external optical system, wherein
   the focus shift adjustment unit:
      issues, with respect to the laser oscillator, a command to emit laser light at a predetermined output or a command to not emit laser light;
      calculates a focus movement amount based on comparison of a first measurement value obtained by averaging peak values measured by the returning light measurement unit when changing from the command not to emit laser light to the command to emit laser light within a first period and a second measurement value obtained by averaging peak values measured by the returning light measurement unit when changing from the command not to emit laser light to the command to emit laser light within a second period that is temporally later than the first period; and
      corrects a focus position during laser cutting based on the calculated focus movement amount, and
   the first period is a period shortly after initiation of laser emission when the external optical system is not warmed up or is a period after correcting the focus position, and the second period is a period after passage of a certain time duration when the external optical system is warmed up.

4. A laser machining device configured to laser machine a workpiece while correcting a focus shift due to contamination of an optical system, the laser machining device comprising:
   a laser oscillator;
   an external optical system being external to the laser oscillator and configured to guide laser light from the laser oscillator and focus the laser light on the surface of a workpiece;

a returning light measurement unit that measures an energy amount of returning light reflected by the workpiece and returning to the laser machining device; and a focus shift adjustment unit that adjusts, based on the energy amount of the returning light of the laser light having an output as high as that used for laser cutting during laser cutting, a focus shift due to contamination of the external optical system, wherein the focus shift adjustment unit:

calculates a change amount per unit time of the energy amount of the returning light measured by the returning light measurement unit;

calculates a focus movement amount based on comparison of a first measurement value obtained by averaging peak values measured by the returning light measurement unit when the calculated change amount per unit time within a first period is greater than or equal to a certain value and a second measurement value obtained by averaging peak values measured by the returning light measurement unit when the calculated change amount per unit time within a second period that is temporally later than the first period is equal to or greater than a certain value; and corrects a focus position during laser cutting based on the calculated focus movement amount, and the first period is a period shortly after initiation of laser emission when the external optical system is not warmed up or is a period after correcting the focus position, and the second period is a period after passage of a certain time duration when the external optical system is warmed up.

5. The laser machining device of claim 1, wherein the focus shift adjustment unit further:

corrects, in a case that a correction amount is incorrect even when correction of the focus position is repeated, a laser power level based on comparison of the first measurement value and the second measurement value.

6. The laser machining device of claim 1, wherein:

the focus shift adjustment unit further calculates a second focus movement amount based on comparison of a first measurement value measured by the returning light measurement unit at a time of a first hole formation machining and a second measurement value measured by the returning light measurement unit at a time of a second hole formation machining that is temporally later than the time of the first hole formation machining; and the time of the first hole formation machining is a point in time shortly after initiation of laser emission when the external optical system is not warmed up or is a point in time after correcting the focus position, and the time of the second hole formation machining is a point in time after passage of a certain time duration when the external optical system is warmed up.

7. The laser machining device of claim 6, wherein the focus shift adjustment unit further switches, based on identification information for identifying a type of laser machining to be executed between calculation of the first focus movement amount and calculation of the second focus movement amount.

8. A laser machining device configured to laser machine a workpiece while correcting a focus shift due to contamination of an optical system, the laser machining device comprising:

a laser oscillator;

an external optical system being external to the laser oscillator and configured to guide laser light from the laser oscillator and focus the laser light on the surface of a workpiece;

a returning light measurement unit that measures an energy amount of returning light reflected by the workpiece and returning to the laser machining device; and a focus shift adjustment unit that adjusts, based on the energy amount of the returning light of the laser light having an output as high as that used for hole formation machining during hole formation machining, a focus shift due to contamination of the external optical system, wherein the focus shift adjustment unit:

calculates a first focus movement amount based on a comparison of a first measurement value measured by the returning light measurement unit at a time of a first hole formation machining and a second measurement value measured by the returning light measurement unit at a time of a second hole formation machining that is temporally later than the time of the first hole formation machining; and corrects a focus position during hole formation machining based on the calculated focus movement amount, and the time of the first hole formation machining is a point in time shortly after initiation of laser emission when the external optical system is not warmed up or is a point in time after correcting the focus position, and the time of the second hole formation machining is a point in time after passage of a certain time duration when the external optical system is warmed up.

9. The laser machining device of claim 8, wherein:

the focus shift adjustment unit further calculates a second focus movement amount based on comparison of a first measurement value obtained by averaging a plurality of measurement values measured by the returning light measurement unit within a first period and a second measurement value obtained by averaging a plurality of measurement values measured by the returning light measuring unit within a second period that is temporally later than the first period; and the first period is a period shortly after initiation of laser emission when the external optical system is not warmed up or is a period after correcting the focus position, and the second period is a period after passage of a certain time duration when the external optical system is warmed up.

\* \* \* \* \*